(12) United States Patent
Tyler

(10) Patent No.: US 12,162,215 B2
(45) Date of Patent: *Dec. 10, 2024

(54) METHOD AND APPARATUS FOR CONTINUOUS COMPOSITE THREE-DIMENSIONAL PRINTING

(71) Applicant: Continuous Composites Inc., Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,400

(22) Filed: Nov. 2, 2023

(65) Prior Publication Data

US 2024/0066796 A1    Feb. 29, 2024

Related U.S. Application Data

(60) Continuation of application No. 17/481,147, filed on Sep. 21, 2021, now Pat. No. 11,945,160, which is a
(Continued)

(51) Int. Cl.
*B29C 64/165* (2017.01)
*B29B 15/12* (2006.01)
(Continued)

(52) U.S. Cl.
CPC ........ *B29C 64/165* (2017.08); *B29C 35/0805* (2013.01); *B29C 64/106* (2017.08);
(Continued)

(58) Field of Classification Search
CPC ..... B29C 64/165; B29C 64/171; B29C 64/20; B29C 64/205; B29C 64/209; B29C 64/10;
(Continued)

(56) References Cited

U.S. PATENT DOCUMENTS 3,046,178 A    7/1962    Tupper
3,286,305 A    11/1966   Seckel
(Continued)

FOREIGN PATENT DOCUMENTS

DE    4102257 A1    7/1992
GB    2213793 A     8/1989
(Continued)

OTHER PUBLICATIONS

Plaintiff's Additional Statement of Disputed Facts filed Sep. 15, 2023 in *Continuous Composites, Inc.* v. *MarkForged, Inc.*, C.A. No. 21-998 (MN) (3 pages).
(Continued)

*Primary Examiner* — Stella K Yi
(74) *Attorney, Agent, or Firm* — Ryan C. Stockett

(57) ABSTRACT

A method and apparatus for the additive manufacturing of three-dimensional objects are disclosed. Two or more materials are extruded simultaneously as a composite, with at least one material in liquid form and at least one material in a solid continuous strand completely encased within the liquid material. A means of curing the liquid material after extrusion hardens the composite. A part is constructed using a series of extruded composite paths. The strand material within the composite contains specific chemical, mechanical, or electrical characteristics that instill the object with enhanced capabilities not possible with only one material.

21 Claims, 11 Drawing Sheets

Related U.S. Application Data continuation of application No. 16/946,469, filed on Jun. 23, 2020, now Pat. No. 11,577,455, which is a continuation of application No. 16/460,701, filed on Jul. 2, 2019, now Pat. No. 10,744,708, which is a continuation of application No. 16/401,541, filed on May 2, 2019, now Pat. No. 10,744,707, which is a continuation of application No. 15/268,156, filed on Sep. 16, 2016, now Pat. No. 10,315,355, which is a division of application No. 13/975,300, filed on Aug. 24, 2013, now Pat. No. 9,511,543.

(60) Provisional application No. 61/694,253, filed on Aug. 29, 2012.

(51) Int. Cl.
| | | |
|---|---|---|
| *B29C 35/08* | (2006.01) | |
| *B29C 64/106* | (2017.01) | |
| *B29C 64/118* | (2017.01) | |
| *B29C 64/209* | (2017.01) | |
| *B29C 64/386* | (2017.01) | |
| *B29C 70/06* | (2006.01) | |
| *B29C 70/38* | (2006.01) | |
| *B29K 105/00* | (2006.01) | |
| *B29K 105/08* | (2006.01) | |
| *B29K 105/12* | (2006.01) | |
| *B29K 105/16* | (2006.01) | |
| *B29K 307/04* | (2006.01) | |
| *B33Y 10/00* | (2015.01) | |
| *B33Y 30/00* | (2015.01) | |
| *B33Y 50/02* | (2015.01) | |
| *B33Y 70/10* | (2020.01) | |
| *B33Y 80/00* | (2015.01) | |

(52) U.S. Cl.
CPC .......... *B29C 64/118* (2017.08); *B29C 64/209* (2017.08); *B29C 64/386* (2017.08); *B29C 70/06* (2013.01); *B29C 70/384* (2013.01); *B33Y 10/00* (2014.12); *B33Y 30/00* (2014.12); *B33Y 50/02* (2014.12); *B33Y 70/10* (2020.01); *B33Y 80/00* (2014.12); *B29B 15/122* (2013.01); *B29C 2035/0827* (2013.01); *B29K 2105/0058* (2013.01); *B29K 2105/08* (2013.01); *B29K 2105/12* (2013.01); *B29K 2105/16* (2013.01); *B29K 2307/04* (2013.01)

(58) Field of Classification Search
CPC ... B29C 64/118; B29C 64/124; B29C 64/379; B29C 64/386; B29C 64/106; B29C 35/0805; B29C 70/08; B29C 70/085; B29C 70/06; B29C 70/384; B33Y 80/00; B33Y 70/00; B33Y 50/02; B33Y 30/00; B33Y 10/00

See application file for complete search history.

(56) References Cited

U.S. PATENT DOCUMENTS

| | | |
|---|---|---|
| 3,809,514 A | 7/1974 | Nunez |
| 3,984,271 A | 5/1976 | Gilbu |
| 3,993,726 A | 11/1976 | Moyer |
| 4,643,940 A | 2/1987 | Shaw et al. |
| 4,851,065 A | 7/1989 | Curtz |
| 5,002,712 A | 3/1991 | Goldmann et al. |
| 5,037,691 A | 8/1991 | Medney et al. |
| 5,121,329 A | 6/1992 | Crump |
| 5,134,569 A | 7/1992 | Masters |
| 5,216,616 A | 6/1993 | Masters |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,197,698 B1 | 3/2001 | Huang et al. |
| 6,459,069 B1 | 10/2002 | Rabinovich |
| 6,501,554 B1 | 12/2002 | Hackney et al. |
| 6,558,146 B1 | 5/2003 | Shah et al. |
| 6,934,600 B2 | 8/2005 | Jang et al. |
| 7,795,349 B2 | 9/2010 | Bredt et al. |
| 8,070,473 B2 | 12/2011 | Kozlak |
| 8,221,669 B2 | 7/2012 | Batchelder et al. |
| 8,580,060 B2 | 11/2013 | Bech |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,174,388 B2 | 11/2015 | Batchelder et al. |
| 10,315,355 B2 * | 6/2019 | Tyler ................... B29C 70/384 |
| 2002/0099355 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 8/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2009/0101278 A1 | 4/2009 | Laberge-Lebel et al. |
| 2010/0259770 A1 | 10/2010 | Usuda et al. |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0174969 A1 | 7/2013 | Karb |
| 2013/0209600 A1 | 8/2013 | Tow |
| 2013/0233471 A1 | 9/2013 | Kappesser et al. |
| 2013/0337265 A1 | 12/2013 | Farmer |
| 2014/0159284 A1 | 6/2014 | Leavitt |
| 2014/0291886 A1 | 10/2014 | Mark |
| 2014/0328963 A1 | 11/2014 | Mark et al. |
| 2015/0217517 A1 | 8/2015 | Karpas et al. |
| 2016/0031155 A1 | 2/2016 | Tyler |
| 2020/0099355 A1 | 3/2020 | Nielsen et al. |

FOREIGN PATENT DOCUMENTS

| | | |
|---|---|---|
| JP | H08156106 A | 6/1996 |
| KR | 100880593 B | 1/2009 |
| KR | 100995983 B1 | 1/2010 |
| KR | 101172859 B1 | 4/2012 |
| WO | 2007129624 A1 | 9/2009 |
| WO | 2013017284 A2 | 2/2013 |

OTHER PUBLICATIONS

Continuous Composites, Inc.'s Brief in Opposition to Defendant MarkForged, Inc.'s Motion for Summary Judgment of Invalidity (Redacted-Public Version) filed Aug. 7, 2023 in *Continuous Composites, Inc.* v. *MarkForged, Inc.*, C.A. No 21-998 (MN) (50 pages).
Declaration of Christopher Higgins in Support of Continuous Composites, Inc.'s Sur-Reply Brief in Opposition to MarkForged, Inc.'s Summary Judgment of Invalidity filed Sep. 15, 2023 in *Continuous Composites, Inc.* v. *MarkForged, Inc.*, C.A. No. 21-998 (MN) (2 pages).

(56) References Cited

OTHER PUBLICATIONS

Exhibits 10 and 11 to Declaration of Christopher Higgins in Support of Continuous Composites, Inc.'s Sur-Reply Brief in Opposition to MarkForged, Inc.'s Summary Judgment of Invalidity (Redacted Version) filed Sep. 15, 2023 in *Continuous Composites, Inc.* v. *MarkForged, Inc.*, C.A. No. 21-998 (MN) (39 pages).
Title page of Exhibits 10-11, and 13 to Declaration of Christopher Higgins in Support of Continuous Composites, Inc.'s Sur-Reply Brief in Opposition to MarkForged, Inc.'s Summary Judgment of Invalidity (Redacted Version) filed Sep. 15, 2023 in *Continuous Composites, Inc.* v. *MarkForged, Inc.*, C.A. No. 21-998 (MN) (2 pages).
Exhibit 12 to Declaration of Christopher Higgins in Support of Continuous Composites, Inc.'s Sur-Reply Brief in Opposition to MarkForged, Inc.'s Summary Judgment of Invalidity filed Sep. 15, 2023 in *Continuous Composites, Inc.* v. *MarkForged, Inc.*, C.A. No. 21-998 (MN) (10 pages).
Exhibit 13 to Declaration of Christopher Higgins in Support of Continuous Composites, Inc.'s Sur-Reply Brief in Opposition to MarkForged, Inc.'s Summary Judgment of Invalidity (Redacted Version) filed Sep. 15, 2023 in *Continuous Composites, Inc.* v. *MarkForged, Inc.*, C.A. No. 21-998 (MN) (2 pages).
Exhibit 8 to Declaration of Christopher Higgins in Support of Continuous Composites, Inc.'s Sur-Reply Brief in Opposition to MarkForged, Inc.'s Summary Judgment of Invalidity filed Sep. 15, 2023 in *Continuous Composites, Inc.* v. *MarkForged, Inc.*, C.A. No. 21-998 (MN) (51 pages).
Continuous Composites, Inc.'s Letter in Opposition to MarkForged, Inc.'s Motion to Strike Expert Reports of Tim Osswald, Ph.D. (Redacted-Public Version), filed Jun. 30, 2023 in *Continuous Composites, Inc.* v. *MarkForged, Inc.*, C. A. No. 21-998 (MN) (5 pages).
Continuous Composites, Inc.'s Letter to the Honorable Laura Hatcher Regarding Supplemental Authority regarding Motion to Strike filed Jul. 25, 2023 in *Continuous Composites, Inc.* v. *MarkForged, Inc.*, C.A. No. 21-998 (MN) (21 pages).
Cover for Exhibits 1 and 2 to Continuous Composites, Inc.'s Letter to the Honorable Laura Hatcher Regarding Supplemental Authority regarding Motion to Strike filed Aug. 1, 2023 in *Continuous Composites, Inc.* v. *MarkForged, Inc.*, C.A. No. 21-998 (MN) (2 pages).
Letter in Support of Continuous Composites, Inc.'s Motion to Strike Portions of the Opening, Rebuttal, and Reply Expert Reports of Ken Gall, Ph.D., filed Jun. 21, 2023 in *Continuous Composites, Inc.* v. *MarkForged, Inc.*, C.A. No. 21-998 (MN) (815 pages).
Exhibits 2, 6-8, and 12-14 to Letter in Support of Continuous Composites, Inc.'s Motion to Strike Portions of the Opening, Rebuttal, and Reply Expert Reports of Ken Gall, Ph.D., filed Jun. 21, 2023 in *Continuous Composites, Inc.* v. *MarkForged, Inc.*, C.A. No. 21-998 (MN) (14 pages).
Exhibit 7 to Letter in Support of Continuous Composites, Inc.'s Motion to Strike Portions of the Opening, Rebuttal, and Reply Expert Reports of Ken Gall, Ph.D., filed Jun. 21, 2023 in *Continuous Composites, Inc.* v. *MarkForged, Inc.*, C.A. No. 21-998 (MN) (5 pages).
Cover Letter for Exhibits 2, 6-8, and 12-14 to Letter in Support of Continuous Composites, Inc.'s Motion to Strike Portions of the Opening, Rebuttal, and Reply Expert Reports of Ken Gall, Ph.D., filed Jun. 21, 2023 in *Continuous Composites, Inc.* v. *MarkForged, Inc.*, C.A. No. 21-998 (MN) (2 pages).
Exhibits 1-7 in Support of Continuous Composites, Inc.'s Opposition to MarkForged, Inc.'s Motion for Summary Judgment (Redacted-Public Version) filed Aug. 7, 2023 in *Continuous Composites, Inc.* v. *MarkForged, Inc.*, C.A. No. 21-998 (MN) (289 pages).
Continuous Composites, Inc.'s Response to MarkForged, Inc.'s Separate Statement of Disputed Facts in Support of its Motion for Summary Judgment (Redacted-Public Version) filed Aug. 7, 2023 in *Continuous Composites, Inc.* v. *MarkForged, Inc.*, C.A. No. 21-998 (MN) (10 pages).
Continuous Composites, Inc.'s Separate Statement of Additional Undisputed Facts in Opposition to Defendant MarkForged, Inc.'s Motion for Summary Judgment of Invalidity (Redacted-Public Version) filed Aug. 7, 2023 in *Continuous Composites, Inc.* v. *MarkForged, Inc.*, C.A. No. 21-998 (MN) (8 pages).
Continuous Composites, Inc.'s Sur-Reply Brief in Opposition to MarkForged, Inc.'s Summary Judgment of Invalidity filed Sep. 15, 2023 in *Continuous Composites, Inc.* v. *MarkForged, Inc.*, C.A. No. 21-998 (MN) (5 pages).
Exhibits 14-16 to Declaration of Christopher Higgins in Support of Continuous Composites, Inc.'s Sur-Reply Brief in Opposition to MarkForged, Inc.'s Summary Judgment of Invalidity filed Sep. 15, 2023 in *Continuous Composites, Inc.* v. *MarkForged, Inc.*, C.A. No. 21-998 (MN) (67 pages).
Declaration of David Benhaim in Support of MarkForged, Inc.'s Motion for Summary Judgment filed Jul. 7, 2023 in *Continuous Composites, Inc.* v. *MarkForged, Inc.*, C.A. No. 21-998 (MN) (14 pages).
Exhibits 1-16 to Declaration of David Benhaim in Support of MarkForged, Inc.'s Motion for Summary Judgment filed Jul. 7, 2023 in *Continuous Composites, Inc.* v. *MarkForged, Inc.*, C.A. No. 21-998 (MN) (256 pages).
Notice of Lodging Exhibits 3 and 4 to Declaration of David Benhaim in Support of MarkForged, Inc.'s Motion for Summary Judgment filed Jul. 7, 2023 in *Continuous Composites, Inc.* v. *MarkForged, Inc.*, C.A. No. 21-998 (MN) (3 pages).
Declaration of Jacqueline Genovese Bova in Support of MarkForged, Inc.'s Motion for Summary Judgment (Redacted-Public Version) filed Jul. 14, 2023 in *Continuous Composites, Inc.* v. *MarkForged, Inc.*, C.A. No. 21-998 (MN) (4 pages).
Declaration of Jacqueline Genovese Bova in Support of MarkForged, Inc.'s Reply Brief in Support of Its Motion for Summary Judgment (Redacted-Public Version) filed Sep. 20, 2023 in *Continuous Composites, Inc.* v. *MarkForged, Inc.*, C.A. No. 21-998 (MN) (4 pages).
Exhibit 20 to Declaration of Jacqueline Genovese Bova in Support of MarkForged, Inc.'s Response to Plaintiff's Sur-Reply Brief to MarkForged, Inc.'s Motion for Summary Judgment (Redacted-Public Version) filed Sep. 20, 2023 in *Continuous Composites, Inc.* v. *MarkForged, Inc.*, C.A. No. 21-998 (MN) (5 pages).
Exhibits 1-12 to Declaration of Jacqueline Genovese Bova in Support of MarkForged, Inc.'s Motion for Summary Judgment (Redacted-Public Version) filed Jul. 14, 2023 in *Continuous Composites, Inc.* v. *MarkForged, Inc.*, C.A. No. 21-998 (MN) (409 pages).
Exhibits 13-18 to Declaration of Jacqueline Genovese Bova in Support of MarkForged, Inc.'s Reply Brief in Support of Its Motion for Summary Judgment (Redacted-Public Version) filed Aug. 18, 2023 in *Continuous Composites, Inc.* v. *MarkForged, Inc.*, C.A. No. 21-998 (MN) (95 pages).
Declaration of Tim Andreas Osswald, Ph.D. in Support of Continuous Composites, Inc.'s Opposition to MarkForged, Inc.'s Motion for Summary Judgment (Redacted-Public Version) filed Aug. 7, 2023 in *Continuous Composites, Inc.* v. *MarkForged, Inc.*, C.A. No. 21-998 (MN) (14 pages).
Exhibit A to Declaration of Tim Andreas Osswald, Ph.D. in Support of Continuous Composites, Inc.'s Opposition to MarkForged, Inc.'s Motion for Summary Judgment (Redacted-Public Version) filed Aug. 7, 2023 in *Continuous Composites, Inc.* v. *MarkForged, Inc.*, C.A. No. 21-998 (MN) (2 pages).
Declaration of Richard Uberto in Support of Continuous Composites, Inc.'s Opposition to MarkForged, Inc.'s Motion for Summary Judgment (Redacted-Public Version) filed Aug. 7, 2023 in *Continuous Composites, Inc.* v. *MarkForged, Inc.*, C.A. No. 21-998 (MN) (5 pages).
IPR2022-00679, Exhibit 1017, Declaration of David Rosen, Ph.D. in Support of Petitioner's Reply to Patent Owner's Response in Inter Partes Review of U.S. Pat. No. 10,744,708, filed Apr. 14, 2023 (45 pages).
IPR2022-00679, Exhibit 1018, Decision Denying Institution of Inter Partes Review of U.S. Pat. No. 9,511,543 B2 (IPR2022-00548), filed Apr. 14, 2023 (25 pages).
IPR2022-00679, Exhibit 1019, Decision Denying Institution of Inter Partes Review of U.S. Pat. No. 10,759,109 B2 (IPR2022-00732), filed Apr. 14, 2023 (25 pages).

(56) References Cited

OTHER PUBLICATIONS

IPR2022-00679, Exhibit 1020, Decision Denying Institution of Inter Partes Review of U.S. Pat. No. 9,987,798 B2 (IPR2022-01218), filed Apr. 14, 2023 (24 pages).
IPR2022-00679, Exhibit 1021, Decision Denying Institution of Inter Partes Review of U.S. Pat. No. 9,987,798 B2 (IPR2022-01220), filed Apr. 14, 2023 (40 pages).
IPR2022-00679, Exhibit 1022, Decision Denying Institution of Inter Partes Review of U.S. Pat. No. 11,173,660 B2 (IPR2022-01431), filed Apr. 14, 2023 (22 pages).
IPR2022-00679, Exhibit 1023, Memorandum and Order entered Mar. 17, 2023 in *Continuous Composites, Inc.* v. *MarkForged, Inc.* (Case No. 21-998-MN, USDC, D. Del.) filed Apr. 14, 2023 (13 pages).
IPR2022-00679, Exhibit 1024, Excerpt from Free High School Science Texts, the Free High School Science Texts: A Textbook for High School Students Studying Physics, Chapter 12, Heat and Properties of a Matter, Dec. 9, 2005 (16 pages).
IPR2022-00679, Exhibit 1025, Excerpt from Crowe, C.T.et al., Engineering Fluid Mechanics, Ninth Ed., filed Apr. 14, 2023 (45 pages).
IPR2022-00679, Exhibit 1026, Declaration of Thomas Hyatt, filed Apr. 14, 2023 (3 pages).
IPR2022-00679, Exhibit 1027, Revised Stipulation and Order Regarding U.S. Pat. Nos. 9,511,543, 10,744,708, and 10,759,109 filed Apr. 3, 2023 in *Continuous Composites, Inc.* v. *MarkForged* (Case No. 21-00998-MN, USDC, D. Del.), filed Apr. 14, 2023 (5 pages).
Opening Expert Report of Ken Gall, Ph.D., filed in *Continuous Composites, Inc.* v. *MarkForged, Inc.* (Case No. 21-998-MN), dated Mar. 31, 2023 (345 pages).
Petitioner's Reply to Patent Owner's Response in Inter Partes Review of U.S. Pat. No. 10,744,708 (IPR2022-00679), filed Apr. 14, 2023 (34 pages).
Markforged, Inc's Letter to the Honorable Maryellen Norieka Regarding Motion to Strike filed (Redacted-Public Version) filed Jun. 28, 2023 in *Continuous Composites, Inc.* v. *MarkForged, Inc.*, C.A. No. 21-998 (MN) (17 pages).
Markforged, Inc.'s Motion for Summary Judgment of Invalidity and Proposed Order filed in *Continuous Composites, Inc.* v. *MarkForged, Inc.*, C.A. No. 21-998 (MN) (5 pages).
Markforged, Inc.'s Opening Brief in Support of Its Motion for Summary Judgment of Invalidity filed in *Continuous Composites, Inc.* v. *MarkForged, Inc.*, C.A. No. 21-998 (MN) (36 pages).
Markforged, Inc.'s Reply Brief in Support of Its Motion for Summary Judgment of Invalidity filed Aug. 11, 2023 in *Continuous Composites, Inc.* v. *MarkForged, Inc.*, C.A. No. 21-998 (MN) (28 pages).
Markforged, Inc.'s Response to Continuous Composites, Inc.'s Separate Statement of Additional Disputed Facts in Opposition to MarkForged, Inc.'s Motion for Summary Judgment of Invalidity filed Aug. 11, 2023 in *Continuous Composites, Inc.* v. *MarkForged, Inc.*, C.A. No. 21-998 (MN) (11 pages).
Markforged, Inc.'s Response to Continuous Composites, Inc.'s Additional Statement of Disputed Material Facts filed Sep. 20, 2023 in *Continuous Composites, Inc.* v. *MarkForged, Inc.*, C.A. No. 21-998 (MN) (6 pages).
Judgement, Final Written Decision Determining No Challenged Claims Unpatentable, IPR2022-00679, U.S. Pat. No. 10,744,708 B2, Filed Sep. 26, 2023, 43 pages.
Markforged, Inc.'s Response to Plaintiff's Sur-Reply Brief to MarkForged, Inc.'s Motion for Summary Judgment filed Sep. 20, 2023 in *Continuous Composites, Inc.* v. *MarkForged, Inc.*, C.A. No. 21-998 (MN) (5 pages).
Exhibit 19, Videotaped Deposition of David Benhaim filed Sep. 20, 2023 in *Continuous Composites, Inc.* v. *MarkForged, Inc.*, C.A. No. 21-998 (MN) (12 pages).
Markforged, Inc.'s Separate Statement of Additional Undisputed Facts in Support of Its Motion for Summary Judgment of Invalidity filed Jul. 7, 2023 in *Continuous Composites, Inc.* v. *MarkForged, Inc.*, C.A. No. 21-998 (MN) (10 pages).
Defendant's Supplemental Final Invalidity Contentions filed Dec. 21, 2022 in *Continuous Composites, Inc.* v. *MarkForged, Inc.*, C.A. No. 21-998 (MN) (131 pages).
A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
Appendix A to Initial Invalidity Contentions, Initial Invalidity Claim Chart for U.S. Pat. No. 9,511,543, served May 17, 2022 (88 pages).
Appendix B to Initial Invalidity Contentions, Initial Invalidity Claim Chart for U.S. Pat. No. 9,987,798 served May 17, 2022 (183 pages).
Appendix C to Initial Invalidity Contentions, Initial Invalidity Claim Chart for U.S. Pat. No. 10,744,708 served May 17, 2022 (81 pages).
Appendix D to Initial Invalidity Contentions, Initial Invalidity Claim Chart for U.S. Pat. No. 10,759,109 served May 17, 2022 (30 pages).
Appendix E to Initial Invalidity Contentions, Initial Invalidity Claim Chart for U.S. Pat. No. 11,173,660 served May 17, 2022 (74 pages).
Appendix F to Supplemental Invalidity Contentions, Initial System Invalidity Claim Chart for U.S. Pat. No. 9,511,543, served Oct. 21, 2022 (305 pages).
Appendix G to Supplemental Invalidity Contentions, Initial System Invalidity Claim Chart for U.S. Pat. No. 9,987,798, served Oct. 21, 2022 (294 pages).
Appendix H to Supplemental Invalidity Contentions, Initial System Invalidity Claim Chart for U.S. Pat. No. 10,744,708, served Oct. 21, 2022 (346 pages).
Appendix I to Supplemental Invalidity Contentions, Initial System Invalidity Claim Chart for U.S. Pat. No. 10,759,109, served Oct. 21, 2022 (294 pages).
Appendix J to Supplemental Invalidity Contentions, Initial System Invalidity Claim Chart for U.S. Pat. No. 11,173,660, served Oct. 21, 2022 (306 pages).
Appendix K to Final Invalidity Contentions, Mark One System Invalidity Claim Charts, served Nov. 4, 2022 (177 pages).
Arduino, RepRap Wiki, Apr. 24, 2010, retrieved from the WayBack Machine (2 pages).
Engineered Composite Structures, Automated Dynamics, 2008-2010, retrieved from https://web.archive.org/web/20100913105826/http://www.automateddynamics.com/content/engineered_composite_structures (1 page).
"Automated Dynamics: Build Smarter," Jul. 16, 2011, retrieved from https://web.archive.org/web/20110716200110/http://www.automateddynamics.com/pdfs/AD_Capabilities.pdf.
Process for Composite Structures, 2008-2010, Automated Dynamics, retrieved from https://web.archive.org/web/20100510084242/http://www.automateddynamics.com/content/processes_composite_structures (1 page).
Bayless, Jacob et al., Wire Embedding 3D Printer, University of British Columbia, Apr. 12, 2010 (45 pages).
Budelmann, D., Prepreg tack: A review of mechanisms, measurement, and manufacturing implication, Polymer Composites, May 6, 2020 Vol. 41, pp. 3440-3458.
Build Thermoplast Extruder, RepRapWiki, Dec. 11, 2010, retrieved from the Wayback Machine (7 pages).
Builders/Config/Config Extruder, from RepRapWiki, Nov. 2, 2010, retrieved from the Wayback Machine (2 pages).
Circuit board construction, RepRap Wiki, Mar. 26, 2010, retrieved from the WayBack Machine (2 pages).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
Costa, Michelle Leali et al., The influence of porosity on the interlaminar shear strength of carbon/epoxy and carbon/bismaleimide fabric laminates, Composites Science and Technology, Feb. 28, 2001 (8 pages).

(56) References Cited

OTHER PUBLICATIONS

"Dassault Thermoplastic Automated Fiber Placement," YouTube.com (Feb. 11, 2008), available at https://www.youtube.com/watch?v=ytZTGRs9Jqk.
Decision Granting Institution of Inter Partes Review of U.S. Pat. No. 10,744,708 dated Oct. 25, 2022 in IPR2022-00679 (36 pages).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
A. Endruweit, M. S. Johnson, & A. C. Long, Curing of Composite Components by Ultraviolet Radiation: A Review, Polymer Composites, pp. 119-128 (Apr. 2005).
Exhibit 1001 in IPR2022-00679, U.S. Pat. No. 10,744,708 to Tyler (20 pages).
Exhibit 1002 in IPR2022-01218, Declaration of David Rosen, Ph.D. in Support of Petition for Inter Partes Review of U.S. Pat. No. 10,744,798 (304 pages).
Exhibit 1002 in IPR2022-01431, Declaration of David Rosen, Ph.D. in Support of Petition for Inter Partes Review of U.S. Pat. No. 10,173,660 (165 pages).
Exhibit 1002 in IPR2022-00548, Declaration of Dr. David W. Rosen in Support of Petition for Inter Partes Review of U.S. Pat. No. 9,511,543, filed Mar. 3, 2022 (278 pages).
Exhibit 1006 in IPR2022-00548, UK Patent Application No. GB 2213793A to Wohrl, Aug. 23, 1989 (9 pages).
Exhibit 1007 in IPR2022-00548, Ma, Erjian, Solid Freeform Fabrication of Continuous Fiber Reinforced Composite Materials, Dissertation Thesis, Auburn University, 2001 (248 pages).
Exhibit 1008 in IPR2022-00548, U.S. Pat. No. 6,153,034 to Lipsker issued Nov. 28, 2000 (9 pages).
Exhibit 1009 in IPR2022-00548, U.S. Pat. No. 5,121,329 to Crump issued Jun. 9, 1992 (15 pages).
Exhibit 1010 in IPR2022-00548, Curriculum Vitae of David W. Rosen, Ph.D. (67 pages).
Exhibit 1011 in IPR2022-00732, Declaration of Sylvia D. Hall-Ellis, Ph.D. regarding U.S. Pat. No. 10,759,109 dated Mar. 21, 2011 (342 pages).
Exhibit 1013 in IPR2022-01218, Declaration of Sylvia D. Hall-Ellis, Ph.D., regarding U.S. Pat. No. 9,987,798, dated May 24, 2022 (624 pages).
Exhibit 1013 in IPR2022-01431, Declaration of Sylvia D. Hall-Ellis, Ph.D. regarding U.S. Pat. No. 11,173,660 (330 pages).
Exhibit 1014 in IPR2022-00679, Declaration of Sylvia D. Hall-Ellis, Ph.D. regarding U.S. Pat. No. 10,744,708, dated Apr. 14, 2022 (612 pages).
Exhibit 1016 in IPR2022-01218, Pang, J et al., A hollow fibre reinforced polymer composite encompassing self-healing and enhanced damage visibility, Composites Science and Technology, vol. 65, pp. 1791-1799, 2005 (9 pages).
Exhibit 1017 in IPR2022-01218, Zhong, W. et al., Short fiber reinforced composites for fused deposition modeling, Materials Science and Engineering, vol. A301, 2001, pp. 125-130 (6 pages).
Exhibit 1017 in IPR2022-00548, Costa, Michelle Leall, The influence of porosity on the interlaminar shear sstrength of carbon/epoxy and carbon/bismaleimide fabric laminates, Composites Science and Technology, vol. 61(2001), pp. 2101-2108.
Exhibit 1018 in IPR2022-00548, Complaint for Patent Infringement, *Continuous Composites* v. *MarkForged, Inc.*, Case No. 1:21-cv-00998-UNA, filed in U.S. District Court, District of Delaware, Jul. 7, 2021 (17 pages).
Exhibit 1019 in IPR2022-00548, Declaration of Sylvia D. Hall-Ellis, Ph.D., regarding U.S. Pat. No. 9,511,543 (342 pages).
Exhibit 2001 in IPR2022-00548, Wikipedia Articles for 3D Printing, Rapid Phototyping, and Filament Winding, Jun. 9, 2022 (51 pages).
Exhibit 2002 in IPR2022-00548, U.S. Pat. No. 2003/0236588 to Jang et al (35 pages).
Exhibit 2004 in IPR2022-00548, Excerpt of Processing and Fabrication Technology, Technomic, 1990 (6 pages).
Exhibit 2006 in IPR2022-01218, Plaintiff Continuous Composites Inc.'s Proposed Claim Terms Filed in *Continuous Composites* v. *MarkForged, Inc.*, Case No. 1:21-cv-00998-UNA on Oct. 7, 2022 (11 pages).
Exhibit 2006 in IPR2022-00732, U.S. Pat. No. 5,936,861 to Jang et al, issued Aug. 10, 1999 (20 pages).
Exhibit 2007 in IPR2022-00732, U.S. Pat. No. 6,129,872 to Jang, issued Oct. 10, 2000 (17 pages).
Extruder Controller 2.2, RepRap Wiki, Apr. 22, 2010, retrieved from the WayBack Machine (19 pages).
S. L. Fan, F. Y. C. Boey, & M. J. M. Abadie, UV Curing of a Liquid Based Bismaleimide-Containing Polymer System, express Polymer Letters, vol. 1, No. 6, pp. 397-405 (2007).
File History for U.S. Appl. No. 61/804,235 entitled "Method for Fiber Reinforced Additive Manufacturing" filed Mar. 22, 2013 (63 pages).
File History for U.S. Appl. No. 61/815,531 entitled "Method for Continuous Core Addative Manufacturing" filled Apr. 24, 2013 (107 pages).
File History for U.S. Appl. No. 61/831,600 entitled "Advanced method for Continuous Core Additive Manufacturing" filed Jun. 5, 2013 (134 pages).
File History for U.S. Appl. No. 61/847,113 entitled "Continuous Core Three Dimensional Printing" filed Jul. 17, 2013 (107 pages).
Fibre Core, RepRapWiki, Jan. 9, 2014, retrieved from the Wayback Machine (3 pages).
Defendant's Final Invalidity Contentions served Nov. 4, 2022 in *Continuous Composites, Inc.* v. *MarkForged, Inc.*, C.A. No. 21-998 (MN) (128 pages).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
"ATL-1117 Gantry" video, Vimeo.com (Jun. 24, 2008), available at https://vimeo.com/1226960.
Heated Bed, RepRapWiki, Aug. 23, 2011, retrieved from the Wayback Machine (9 pages).
How to build RepRap 1.0 "Darwin," RepRapOneDarwin, undated (4 pages).
Defendant's Initial Invalidity Contentions served May 17, 2022 (75 pages).
Installing RepRap on your computer, RepRap Wiki, Jun. 12, 2010, retrieved from the WayBack Machine (6 pages).
Introducing the MakerBot Replicator, Jan. 9, 2012, MakerBot Industries, retrieved from The WayBack Machine (19 pages).
Kenneth C. Kennedy II & Robert p. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.
S. Kumar & J.-P. Kruth, Composites by Rapid Prototyping Technology, Materials and Design, (Feb. 2009).
T M. Llewelly-Jones, Bruce W. Drinkwater, & Richard S. Trask; 3D Printed Components With Ultrasonically Arranged Microscale Structure, Smart Materials and Structures, 2016, pp. 1-6, vol. 25, IOP Publishing Ltd, UK.
Vincent J. Lopata et al., Electron-Beam-Curable Epoxy Resins for the Manufacture of High-Performance Composites, Radiation Physics and Chemistry, vol. 56, pp. 405-415 (1999).
Lukaszewicz, D.H.-J.A., Ward, C., & Potter, K.D. (2011), The engineering aspects of automated prepreg layup: History, present and future, Composites: Part B., vol. 43, pp. 997-1009 (13 pages).
Insurgent Creative: the Makerbot Replicator, Jan. 9, 2012, retrieved from the WayBack Machine (3 pages).
MakerBot Announces New Replicator 2 & 2X Desktop 3D Printers, a New York MakerBot Store, New Software, and More, BusinessWire, Sep. 19, 2021 (4 pages).
Makerbot announces Replicator 2 "Prosumer" 3D printer, Sep. 20, 2012, New Atlas.com, retrieved from https://newatlas.com/makerbol-replicalor-2-3d-printer/24209/ (14 pages).
"MakerBot Discovery Quick Tip: Watch the First Layer," YouTube.com (Feb. 18, 2013), available at https://www.youtube.com/watch?v=UDt47V810z0.

(56) References Cited

OTHER PUBLICATIONS

Brown, Rich, MakerBot Replicator 3D printer beams in, Jan. 9, 2012, CNET.com (12 pages).
"The MakerBot Replicator 2—Startup Process," YouTube.com (Oct. 4, 2012), available at https://www.youtube.com/watch?v=KYGjICc-fV4.
MakerBot Replicator 2, Desktop 3D Printer, Single Extruder brochure, Wohlers Report, 2012 (9 pages).
Replicator 2X Experimental 3D Printer User Manual (n.d.), MakerBot Industries, LLC (116 pages).
"Makerbot Replicator Printing in 3D!," YouTube.com (Apr. 11, 2012), available at https://www.youtube.com/watch?v=WuQpzPGmXmA.
MakerBot Industries—The Replicator in the News! Jan. 10, 2012, retrieved from the WayBack Machine (6 pages).
"Not Exactly a Mailbag: The Makerbot Replicator Arrives," YouTube.com (Jul. 24, 2012), available at https://www.youtube.com/watch?v=LO8xKv0iUd8.
MakerBot Replicator Original Product Specification, Jan. 26, 2012, retrieved from the WayBack Machine (2 pages).
"MakerBot Replicator Unboxing," YouTube.com (Apr. 19, 2012), available at https://www.youtube.com/watch?v=u5EjOw6mZsc.
MakerBot Replicator 2 Desktop 3D Printer, User Manual, MakerBot.com, undated (60 pages).
MakerBot Industries: Robots That Make Things! Jan. 6, 2012, MakerBot Industries, retrieved from the WayBack Machine (5 pages).
Mark One: World's First Carbon Fiber 3D Printer Now Available for Order, Feb. 20, 2014, MarkForged, Inc. (1 page).
M. Martin-Gallego et al., Epoxy-Graphene UV-Cured Nanocomposites, Polymer, vol. 52, Issue 21, pp. 4664-4669 (Sep. 2011).
Mendel frame, RepRap Wiki, Apr. 2, 2010, retrieved from the WayBack Machine (16 pages).
Mendel Specification Documentation, Jul. 3, 2020 (2 pages).
Mendel User Manual: Host Software, Mar. 23, 2010, retrieved from the WayBack Machine (10 pages).
Mendel User Manual: Extruder, from RepRapWiki, Dec. 20, 2021, retrieved from the Wayback Machine (6 pages).
"RepRap Mendel's first print," YouTube.com (Oct. 20, 2009), https://www.youtube.com/watch?v=Xu1XIDsw5e0.
Founding Story and an Abridged History of Additive Manufacturing (undated), MarkForged, Inc. (92 pages).
MarkForged Press Release—Mark One: World's First Carbon Fiber 3D Printer Now Available for Order, Feb. 20, 2014 (1 page).
Documents Prodced as MFI-114335-4660 in Appendix K to Final Invalidity Contentions, Mark One System Invalidity Claim Charts, served Nov. 4, 2022 (326 pages).
Mojo 3D Printer User Guide, Stratasys, Inc., 2013 (66 pages).
"Stratasys—Mojo 3D Printer," YouTube.com (May 18, 2012), available at https://www.youtube.com/watch?v=M-bt7pyZr0s.
Mojo: Give Your Big Idea a Little Mojo; Specification Sheet, Stratasys, Inc., 2012 (2 pages).
Mojo 3D Printer Brochure, Stratasys, Inc., 2012 (2 pages).
Frequently Asked Questions, Mojo Enhancements, Stratasys, Ltd., 2015, (3 pages).
Mojo Frequently Asked Questions, retrieved from https://web.archive.org/web/20120512211606/http://www.mojo3dprinting.com/printers/faqs.aspx (2 pages).
"Stratasys—Mojo Personal Desktop 3D Printer," YouTube.com (Sep. 20, 2012), available at https://www.youtube.com/watch?v=BAZTaGyZ0EQ.
Mojo Site Preparation Guide, Part No. 400735-0001, Stratasys, Inc., Rev. A, Jan. 2016 (9 pages).
Mojo 3D Printer Specification Sheet, Stratasys, Inc., 2012 (2 pages).
"Multi-tow TP ATL Individual Tow Control" video, Vimeo.com (Feb. 29, 2008), available at https://vimeo.com/740784.
Nikzad, Mostafa, New Metal/Polymer Composites for Fused Deposition Modelling Applications, Swinburne University of Technology, Melbourne, Australia, May 2011 (274 pages).
Nophead's Extruder Tweaks, RepRapWiki, Aug. 25, 2011, retrieved from the WayBack Machine (13 pages).
File: NopsTestForFit.JPG, RepRapWiki, Jun. 15, 2010, retrieved from the WayBack Machine (1 page).
Durham, Paula, Objet Wiper Maintenance, Nov. 25, 2019, retrieved from https://www.cati.com/blog/objet-wiper-maintenance/ (3 pages).
Objet30—Bring precision prototyping to your desktop (2021), Stratasys Ltd. (1 page).
Objet30 3D Printer Systems User Guide, (2013), Stratasys, Ltd. (157 pages).
Objet30 3-D Printer System User Guide, Objet Geometrics Ltd., Nov. 2010 (142 pages).
Objet30 Pro Brochure (2015). Stratasys, Ltd., (2 pages) .
"onshoulders Tv: RepRap 3d Printer Makes a Child," YouTube.com (Aug. 25, 2010), available at https://www.youtube.com/watch?v=kqhq5p6cKpM.
Paper No. 2, Petition for Inter Partes Review of U.S. Pat. No. 10,759,109, Case No. IPR2022-00732, filed Mar. 24, 2022 (105 pages).
Paper No. 2, Petition for Inter Partes Review of U.S. Pat. No. 9,511,543, Case No. IPR2022-00652, filed Mar. 3, 2022 (109 pages).
Paper No. 2, Petition for Inter Partes Review of U.S. Pat. No. 10,744,708, Case No. IPR2022-00679, filled Apr. 26, 2022 (117 pages).
Paper No. 3, Petition for Inter Partes Review of U.S. Pat. No. 9,987,798 (IPR2022-01220) filed Jul. 1, 2022 (125 pages).
Paper No. 3, Petition for Inter Partes Review of U.S. Pat. No. 11,173,660 (IPR2022-01431) filed Aug. 18, 2022 (95 pages).
Paper No. 3, Petition for Inter Partes Review of U.S. Pat. No. 9,511,543, Case No. IPR2022-00548, filed Mar. 3, 2022 (107 pages).
Paper No. 5, Corrected Petition for Inter Partes Review of U.S. Patent No. 9.987,798 (IPR2022-01218) filed Jul. 13, 2022 (111 pages).
Paper No. 6, Patent Owner's Preliminary Response filed Aug. 8, 2022 in IPR2022-00679 (64 pages).
Paper No. 7, Decision Denying Institution of Inter Partes Review of U.S. Pat. No. 10,759,109 in IPR2022-00732 (25 pages).
Paper No. 7, Patent Owner's Preliminary Response in IPR2022-01220, filed Oct. 13, 2022 (76 pages).
Paper No. 7, Patent Owner's Preliminary Response to Petition for Inter Partes Review of U.S. Pat. No. 9,511,543 in IPR 2022-00548 filed Jun. 16, 2022 (75 pages).
Paper No. 7, Patent Owner's Preliminary Response filed Jun. 15, 2022 in IPR2022-00652 (72 pages).
Paper No. 8, Decision Denying Institution of Inter Partes Review of U.S. Pat. No. 9,511,543 in IPR 2022-00548 dated Sep. 9, 2022 (25 pages).
Paper No. 8, Decision Denying Institution of Inter Partes Review dated Sep. 9, 2022 in IPR2022-00652 (18 pages).
Paper No. 9, Patent Owner's Preliminary Response filed Oct. 13, 2022 in IPR2022-1218 (72 pages).
Paper No. 6, Patent Owner's Preliminary Response filed Jun. 24, 2022 in IPR2022-00732 (76 pages).
"Print Reality with the Objet24 and Objet30 3D Printers," YouTube.com (Dec. 2, 2010), available at https://www.youtube.com/watch?v=jBqGmKMulKM.
"RepRap Mendel Making Mendels," YouTube.com (Mar. 30, 2010), https://www.youtube.com/watch?v=02myN2Y3IB4.
"Reprap Mendel printing my first thing," YouTube.com (Dec. 26, 2010), https://www.youtube.com/watch?v=Kri8XVv-8hY.
"RepRap Mendel's first print," YouTube.com (Oct. 20, 2009), available at https://www.youtube.com/watch?v=Xu1XIDsw5e0.
SpoolHead from RepRapWiki, Jan. 22, 2010, retrieved from the WayBack Machine (4 pages).
Thermocouple Sensor 1.0, RepRapWiki, Dec. 31, 2010, retrieved from the WayBack Machine (8 pages).
RepRapOneDarwin Thermopoast Extruder, Oct. 29, 2010, retrieved from the WayBack Machine (9 pages).
RepRap SpoolHead, Nov. 15, 2010, retrieved from the WayBack Machine (5 pages).

(56) References Cited

OTHER PUBLICATIONS

Respini-Irwin, Cyrena, SolidWorks World 2014, Part 2: Trends on Display in the Partner Pavilion, Cadalyst.com, Feb. 24, 2014 (5 pages).
Hyouk Ryeol CHOI and Se-gon ROH, In-pipe Robot with Active Steering Capability for Moving Inside of Pipelines, Bioinspiration and Robotics: Walking and Climbing Robots, Sep. 2007, p. 544, I-Tech, Vienna, Austria.
Sloan, Jeff, ATL and AFP: Defining the megatrends in composite aerostructures, Composites World, Jun. 30, 2008.
The SolidWorks Blog, SolidWorks World 2014: Tuesday General Sessions Recap, Dassault Systemnes, Jan. 28, 2014 (7 pages).
Defendant's Supplemental Final Invalidity Contentions served Dec. 21, 2022 in *Continuous Composites, Inc.* v. *MarkForged, Inc.*, C.A. No. 21-998 (MN) (131 pages).
Defendant's Supplemental Invalidity Contentions served Oct. 21, 2022 in *Continuous Composites, Inc.* v. *MarkForged, Inc.*, C.A. No. 21-998 (MN) (113 pages).
Tenney, Darrel R. et al., Structural Framework for Flight: NASA's Role in Development of Advanced Composite Materials for Aircraft and Space Structures, NASA/cr-2011-217076 (504 pages).
"Thermoplastic Automated Fiber Placement—Cylinder with Extraction & Trim," YouTube.com (Feb. 11, 2008), available at https://www.youtube.com/watch?v=EvSY9HcAbBU.
Ultimaker—The fast, easy to use, Open-source 3D printer, Welcome to the Ultimaker Original User Manual, Version 1.1, undated, Ultimaker B.V. (35 pages).
Ultimaker Original Assembly Manual, English Version 1 (n.d.), Ultimaker B.V. (109 pages).
"Ultimaker Feeding Filament," YouTube.com (Jan. 13, 2013), available at https://www.youtube.com/watch?v=SDizDuAyK9E.
Intended Use of the Ultimaker Original, Ultimaker B.V., May 20, 2022 (2 pages).
Ultimaker Original + Assembly Manual, Original Manual v3.2, 2017, Ultimaker B.V. (98 pages).
"Ultimaker Original first print," YouTube.com (Feb. 24, 2014), available at https://www.youtube.com/watch?v=MwPJWkNuzUk.
Van Geelen, Sander; Ultimaker Original upgrades, Ultimaker. B.V., Jun. 2, 2016 (7 pagges).
Ultimaker Original+ Specification Sheet, (undated), Ultimaker, B.V. (2 pages).
The Ultimaker Original+ UltiController, May 20, 2022, Ultimaker, B.V. (3 pages).
PT100B Sensor Specification Sheet, Ultimaker Original, (n.d.), Ultimaker, B.V. (1 page).
Ultimaker Original RepRap Wiki, Oct. 26, 2011, retrieved from the Wayback Machine, (2 pages).
"Solar System by Prototipadora—Ultimaker: 3D Printing Timelapse," YouTube.com (May 17, 2016), available at https://www.youtube.com/watch?v=xQ10gN3rY-o.
Hipolite, Whitney, Ultimaker Announces the Ultimaker Original+ 3D Printer & Heated Bed Upgrade Kit, Sep. 20, 2014, retrieved from the WayBack Machine (5 pages).
Wang, C. Jeff et al., Solid Freeform Fabrication of Composite-Material Objects, Lyndon B. Johnson Space Center, Houston, TX, Nasa Tech Briefs, Jul. 2005 (2 pages).

\* cited by examiner

METHOD AND APPARATUS FOR CONTINUOUS COMPOSITE THREE-DIMENSIONAL PRINTING

RELATED APPLICATIONS

This application is a continuation of, and claims the benefit of priority to U.S. application Ser. No. 17/481,147 that was filed on Sep. 21, 2021, which is a continuation of, and claims the benefit of priority to U.S. application Ser. No. 16/946,469 that was filed on Jun. 23, 2020, which is based on and claims the benefit of priority from U.S. application Ser. No. 16/460,701 that was filed on Jul. 2, 2019, which is based on and claims the benefit of priority from U.S. application Ser. No. 16/401,541 that was filed on May 2, 2019, which is based on and claims the benefit of priority from U.S. application Ser. No. 15/268,156 that was filed on Sep. 16, 2016, which is based on and claims the benefit of priority from U.S. application Ser. No. 13/975,300 that was filed on Aug. 24, 2013, which is based on and claims the benefit of priority from U.S. Provisional Application No. 61/694,253 that was filed on Aug. 29, 2012, the contents of all of which are expressly incorporated herein by reference.

BACKGROUND

Additive Manufacturing is a process that creates physical parts from a three-dimensional digital file. The current most common additive manufacturing techniques include stereo lithography (SLA) and selective laser sintering (SLS). These processes build a three-dimensional part by converting the digital file into several horizontal layers. For the sake of clarity, this application refers to each layer of an additive manufactured part created by SLA or SLS as a slice. The base slice is created, and then successive slices are added one at a time on top of each other, building the part from the bottom up.

SLA performs this method by extruding liquid resin, which is curable with a UV laser. The resin is extruded first in the base slice, and then a UV light cures and solidifies the slice. Another slice is extruded atop that slice and cured. This process continues adding slices upon each other until the part is complete.

SLS uses a reductive technique. A layer of small particles, comparable to powder or sand, is placed on a printing surface. The particles may be plastic, metal, glass, or other material. A laser draws the first slice of the part in the particles, fusing them together to form the base of the part. Another layer of particles is then added across the entire printing surface. The laser then fuses the newly added particles together in the desired shape of the next slice. More particles are added, and the laser fuses more slices until the entire part is fused. The part is then removed from the loose particles.

Additionally, there are other additive manufacturing techniques similar to SLS that use a binder material, instead of a laser, to fuse particles together. It still builds the part with a slicing technique, starting from the base and adding slices one at a time.

To strengthen the parts, some additive manufacturing techniques add reinforcing particles. This creates a heterogeneous mixture rather than pure resin, plastic, or metal. The reinforcing particles are randomly distributed throughout the part. A comparable application is the addition of aggregate to cement to create concrete.

The additive manufacturing techniques described above have several disadvantages. The process of building parts layer by layer is slow, and necessitates parts being designed to accommodate the slicing process. The parts are built slice upon slice, with vulnerable joints between each, creating a relatively weak part. Additionally, the materials used are mostly homogeneous plastic or resin, with a minority of manufacturers adding reinforcing particles. These materials have much room for improvement with regard to strength and efficiency.

There is a need for a method and apparatus of additive manufacturing that builds parts faster and easier than the current slicing methods, and also creates stronger parts than the current single or composite materials in use.

SUMMARY

A method and apparatus for additive manufacturing are described below. The new method is called Continuous Composite Three-Dimensional Printing (CC3D). This method enables the additive manufacturing of parts utilizing two or more materials, and uses an alternate means of building parts with paths rather than slices. This affords stronger lighter parts, with flexibility in structure, design, and functionality. Throughout this application, the term part refers to any three-dimensional object created by additive manufacturing.

The method allows for two or more materials simultaneously incorporated into the construction of a part. There is at least one primary material and at least one secondary material. The primary material is a curable liquid, the best mode being a photosensitive resin. The second material is a solid strand. The strand may be any material, the best mode being carbon fiber. These two materials are extruded together, with the secondary material fully encased within the primary material.

Together, the primary material and the at least one secondary material are called the composite material. An extruder emits the composite material in a continuous path. As the composite material is extruded, a means for curing, possibly a UV light, hardens the composite material.

Instead of the slicing method described in the background, the invention uses a pathing method. A digital model of the part is analyzed and broken up into paths. A part may contain only one path, or multiple paths. Each path is one continuous extrusion of the composite material. When a path is completed, the composite material is cut and additional paths may be printed to create the part.

The combination of composite material and pathing adds strength to the part. Slicing creates several layers of a single material stacked upon each other. Only a chemical bond between slices, or gravity, holds the part together. By adding a continuous secondary material, an additional mechanical structure stabilizes the part.

The use of composites also more efficiently uses the primary material. The surface tension created between the secondary and primary materials allows for the minimal use of primary material. For example, a higher carbon fiber to resin ratio allows parts to be lighter, less costly, stronger, and more flexible. The inclusion of a hollow tube as the secondary material also has similar weight, flexibility, and efficiency benefits.

The composite material may be several alternative embodiments. The primary material can be any liquid material suitable for extruding and curing. The secondary material can be any material in the form of a strand. Examples of potential secondary materials include carbon fiber, fiber optics, metal wire, or a hollow rubber tube. Additionally, the secondary material may be a combination of materials. An example could be metal wire within a rubber tube.

The use of CC3D with various composites, allows for increased flexibility in design and function. Composite material adds strength during the manufacturing, allowing paths to extend in three dimensions, rather than only along horizontal planes. This gives the designer flexibility in creating parts.

Additionally, the secondary material provides alternative functions not currently supported by additive manufacturing. The use of fiber optics or other conductive materials in continuous strands, affords the creation of parts with electronic capabilities. A part may have integrated circuitry, or a conductive surface, allowing designers to print what may be termed intelligent parts and parts with intelligent surfaces.

DETAILED DESCRIPTION

Continuous Composite Three-Dimensional Printing is a new method of additive manufacturing. This method enables the additive manufacturing of parts comprising two or more materials, and uses an alternate means of building parts with paths rather than slices.

Two or more materials are simultaneously incorporated into the construction of a part, creating a composite material path. The simplest embodiment of this method is the use of two materials. The primary material is a liquid curable material, and the secondary material is a solid strand.

The secondary material is fed through a nozzle at the same time that the primary material is extruded through the nozzle. The secondary material is fully surrounded by the primary material during the extrusion. Once the composite material is extruded it is cured becoming a solid composite path.

Figure 1:
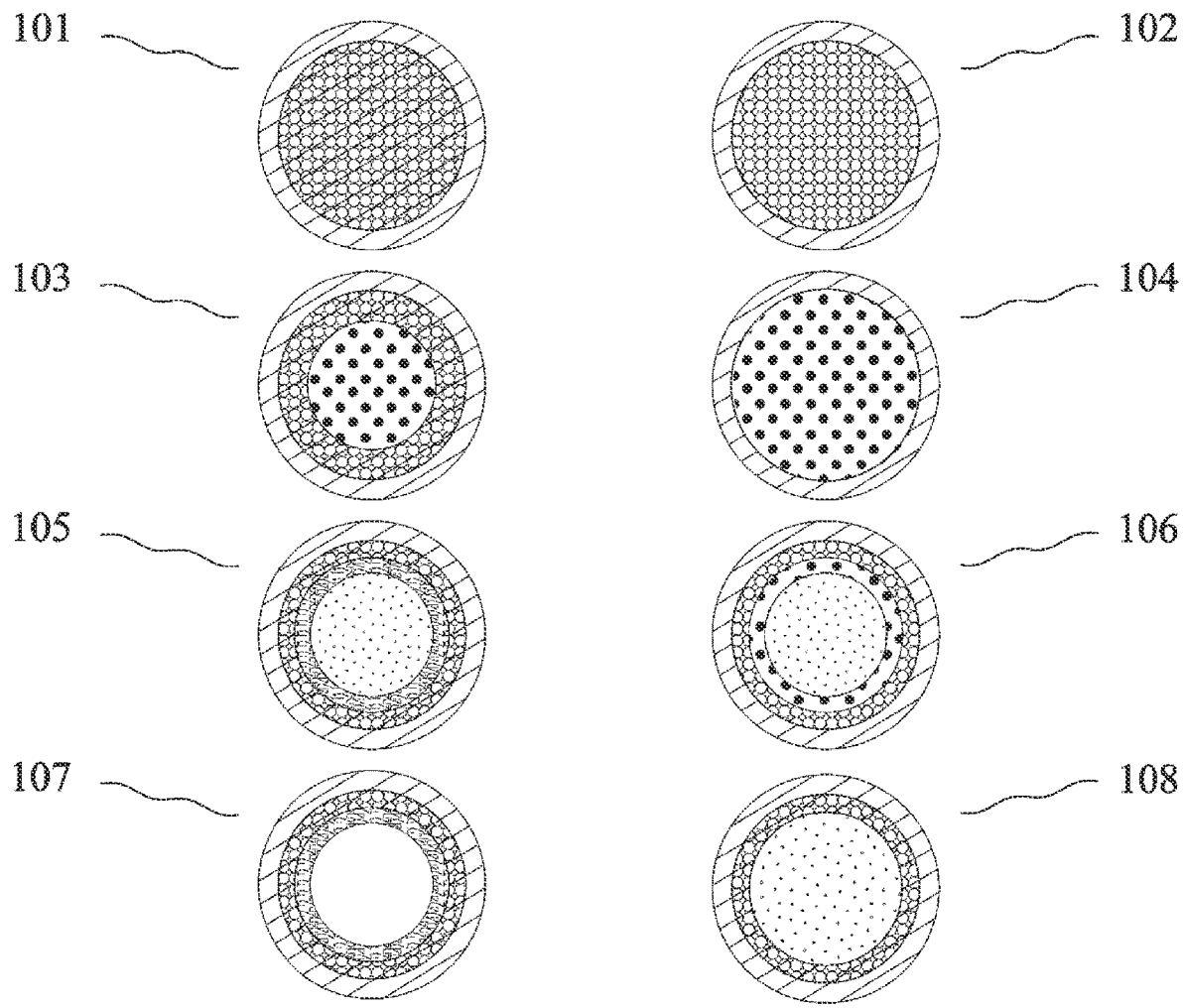
FIG. 1 is a set of example cross-sections of continuous composite paths, showing alternative primary and secondary materials.

FIG. 1 shows eight example cross-sections of composite material paths created by the method. The primary material in each of these cross sections is a polymer resin. The secondary materials shown include carbon fiber, fiber optics, metallic wire, and rubber. Each cross-section has at least one secondary material entirely encased within the primary material. The best mode for a composite material path, seen in FIG. 1, is carbon fiber encased within polymer resin 102.

The apparatus includes a reservoir for containing the primary material, and a means for delivering the primary material to the nozzle upon extrusion. Since primary materials are curable, the reservoir and means for delivery should be kept cool and dark as required to prevent curing before extrusion.

As show in FIG. 1, the best mode for the primary material is polymer resin, specifically a single component zero volatile organic compound resin, but any curable liquid material is included. Potential primary materials include epoxy resins, polyester resins, cationic epoxies, acrylated epoxies, urethanes, esters, thermoplastics, photopolymers, polyepoxides, metals, metal alloys, and more.

Interchangeable reservoirs and distribution tubes are included in the best mode, allowing the apparatus to support the use of multiple primary materials for the manufacturing of different parts.

Additionally, the primary material may be a combination of multiple materials. An example is a two-part epoxy. The two parts are combined in a mixing chamber prior to extrusion and extruded with the secondary material. In this instance, the apparatus will comprise two reservoirs for the two epoxies, and a mixing chamber connected to the extruder. The mixing chamber applies heat and pressure to the epoxy prior to extrusion.

The apparatus includes a spool or other means of storing the secondary material. The secondary material is a solid strand and flexible enough to be wound around a spool. It may be a single strand, a tow of several strands, a roving of several strands, or multiple strands woven together. The strands may be any shape, including circular, square, or flat.

FIG. 1 shows multiple examples of possible secondary materials. Included are carbon fiber, fiber optics, metal wire, and rubber. The strand may be any solid material. It may be a natural fiber produced by a plant, animal, or geological process. Example natural fibers include vegetable fibers such as cotton, hemp, jute, flax, ramie, rubber, sisal, and bagasse. Wood fibers include groundwood, thermomechanical pulp, and bleached or unbleached kraft or sulfite pulps. Animal fibers include silk, wool, fur and spidroins. Mineral fibers include chrysotile, amosite, crocidolite, tremolite, anthophyllite, and actinolite.

A six-thousand strand tow of carbon fiber with a diameter of approximately one millimeter is the best mode for the secondary material.

Secondary materials may also be composed of synthetic materials. Examples of synthetic materials include metals, metal alloys, aramid, carbon fibers, silicon carbides, fiberglass, petrochemicals, and polymers.

Pre-impregnating the secondary material is also envisioned. A secondary material is pre-pregged when it is saturated with another material. An example is pre-pregged carbon fiber. The carbon fiber is in the form of a weave, roving, or tow, and is saturated with liquid polymer resin. The polymer resin is only partially cured to allow for ease of handling. It is important to keep this partially cured secondary material cool and away from light to prevent premature curing prior to extrusion. FIG. 1 includes a cross-section of pre-pregged carbon fiber encased within polymer resin 101.

Multiple secondary materials may be present in a composite material path. The secondary material may be composed of multiple materials itself, as long as it maintains its strand form. Examples of multiple secondary materials are included in FIG. 1. Fiber optics encased in pre-pregged carbon fiber 103, metal wire encased within rubber encased within pre-pregged carbon fiber 105, metal wire encased within fiber optics encased within carbon fiber 106, rubber encased within pre-pregged carbon fiber 107, and metal wire encased within pre-pregged carbon fiber 108. Each of these examples of composite material is also encased in a primary material comprising polymer resin.

Another embodiment of the invention includes a secondary material that is hollow. The secondary material may be a strand that is in the form of a tube. A rubber tube encased within pre-pregged carbon fiber 107 is an example of a hollow secondary material. See FIG. 1. The hollow tube may serve as a conduit for another substance, or simply left vacant to reduce weight.

It is envisioned that more than one secondary material may be desired during the manufacturing of a part. Multiple spools holding multiple secondary materials are envisioned. A housing and/or loom may be used to provide variable fiber to the mixing head. Fibers of any kind may be used, spun, sewn, woven together or as a single thread. Flakes of fiber might also be introduced with the liquid as filler. The fiber is not limited to thread. It may be any combination of elements, and/or rare earths. The secondary materials may feed into the nozzle sequentially so that a part is comprised of a variety of composite material paths.

The apparatus includes an extruder housing, comprised of an extruder, a nozzle, a feeder, and a feeder flap. See FIG. 4. The extruder 401 is the location where the liquid primary material is collected before being extruded out of the nozzle. It may be any shape that facilitates the flow of primary material.

Figure 3:
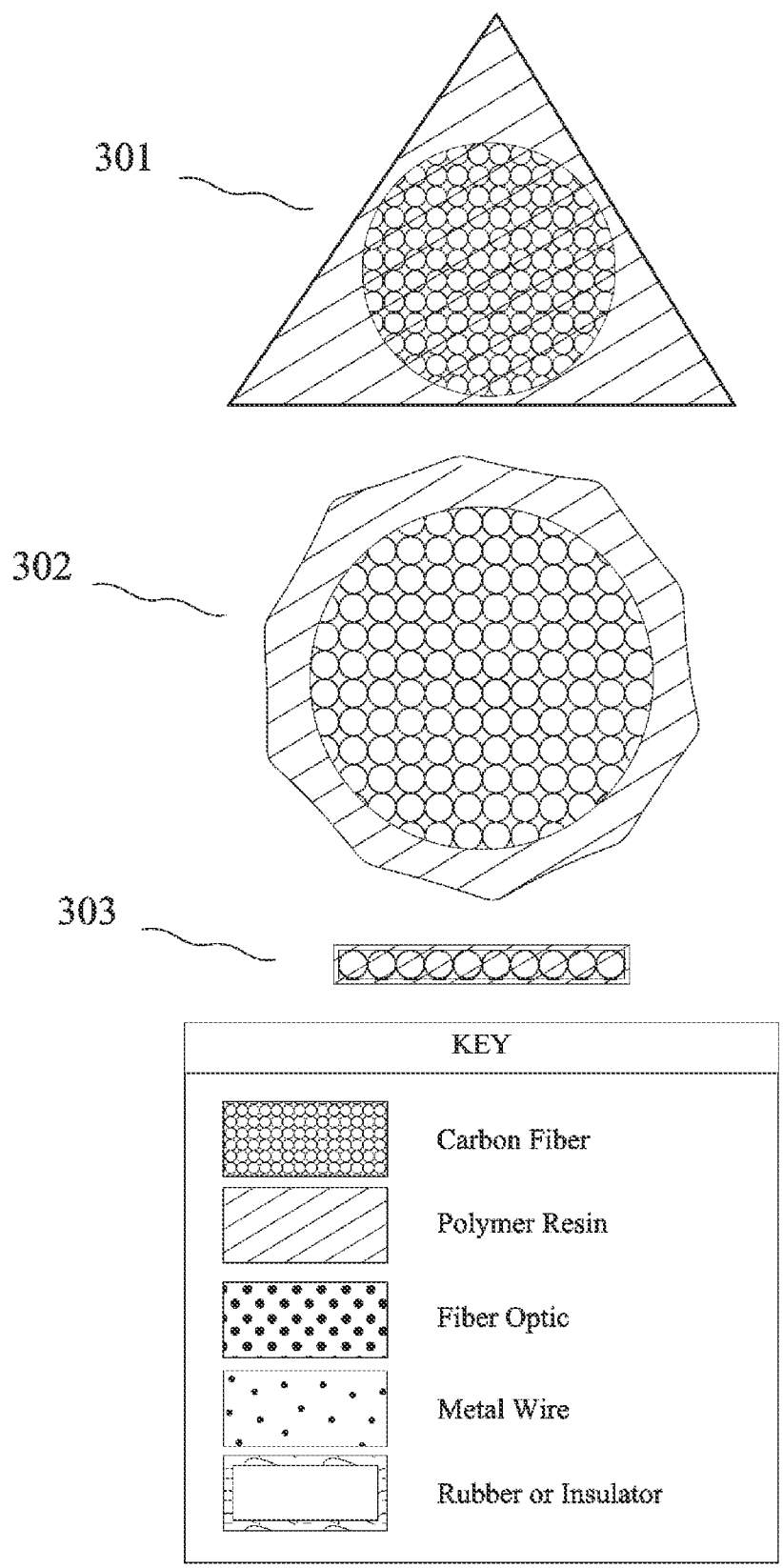
FIG. 3 is a set of example cross-sections of continuous composite paths, showing alternative nozzle shapes.

The nozzle is the actual point of extrusion of the composite material 402. See FIG. 4. The best mode for a nozzle is circular, with a diameter of 2 mm. Any size and shape nozzle is envisioned, as necessitated by the part or economy of manufacture. The cross-sections shown in FIG. 1 demonstrate composite paths manufactured with a circular nozzle. FIG. 3 shows three examples of composite paths created with nozzles of alternative shapes, a triangular nozzle 301, a decagon 302, and a rectangle with a secondary material in a tape form 303. Any polygonal shaped nozzle is envisioned. The nozzle is interchangeable, allowing an apparatus to manufacture parts with different shaped paths, and different sized paths.

Figure 4:
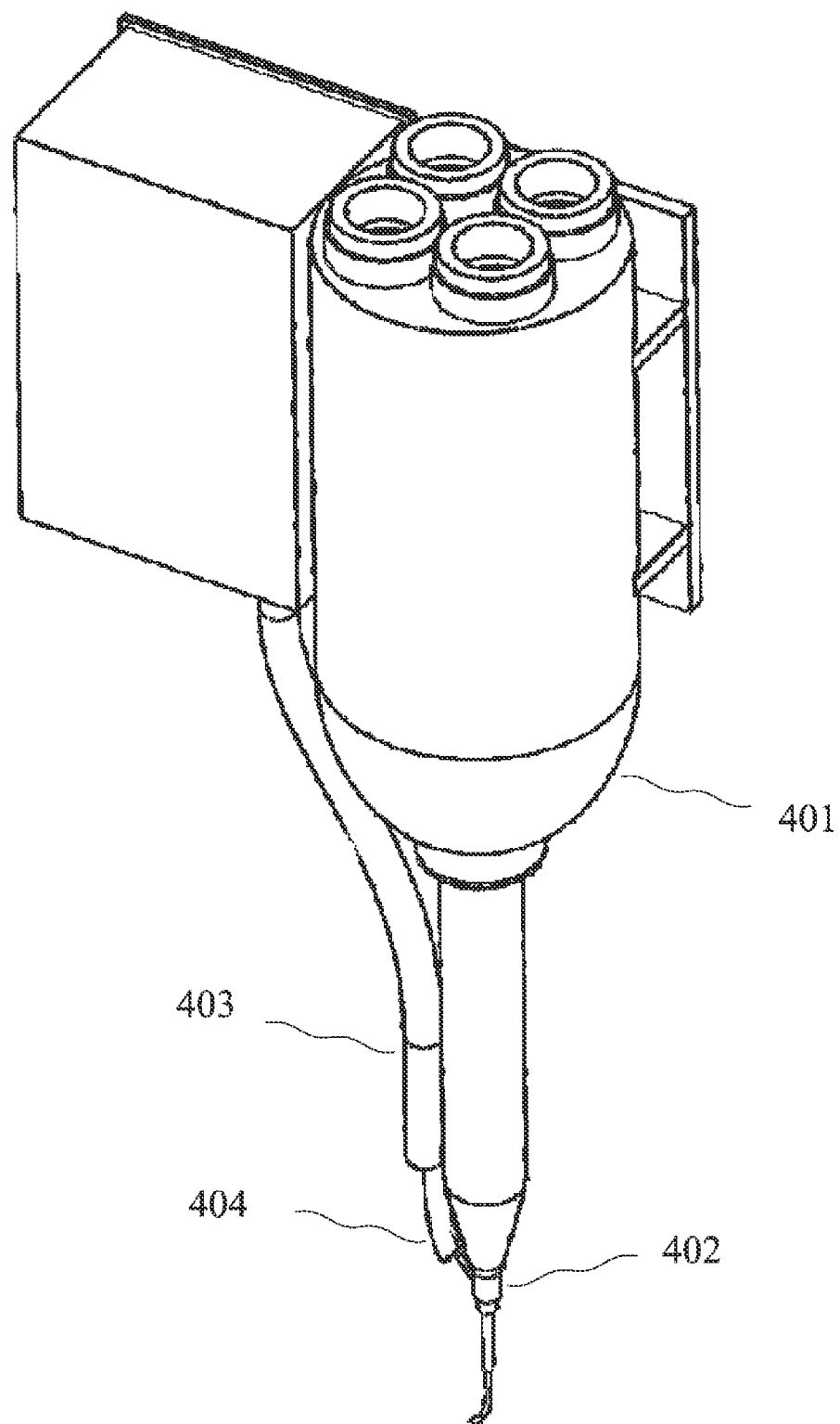
FIG. 4 is a perspective view of one embodiment of the extruder housing.

The extruder housing also contains a feeder 403, as shown in FIG. 4. The feeder directs the secondary material to the extruder. The feeder connects to the extruder prior to the nozzle, and feeds the secondary material into the extruder. The secondary material is extruded through the nozzle with the primary material, creating a composite material path.

The secondary material passes through a feeder flap. The feeder flap 404 is a one-way valve that allows the secondary material to enter the extruder, but prevents the primary material from entering the feeder.

The feeder may also have a motorized control dictating the feed rate. Certain embodiments create composite paths with tension, which will naturally pull the secondary material out through the nozzle. Other embodiments create paths without tension and require a motor to control the feed rate. The motor synchronizes the feed rate with the extrusion rate, the rate at which the primary material is extruded.

Multiple feeders for multiple strands are envisioned, allowing the apparatus to easily alternate between secondary materials during the manufacturing of a part.

The composite material is extruded and then cured. The best mode cures the composite material immediately after extrusion, creating a solid path.

Figure 5:
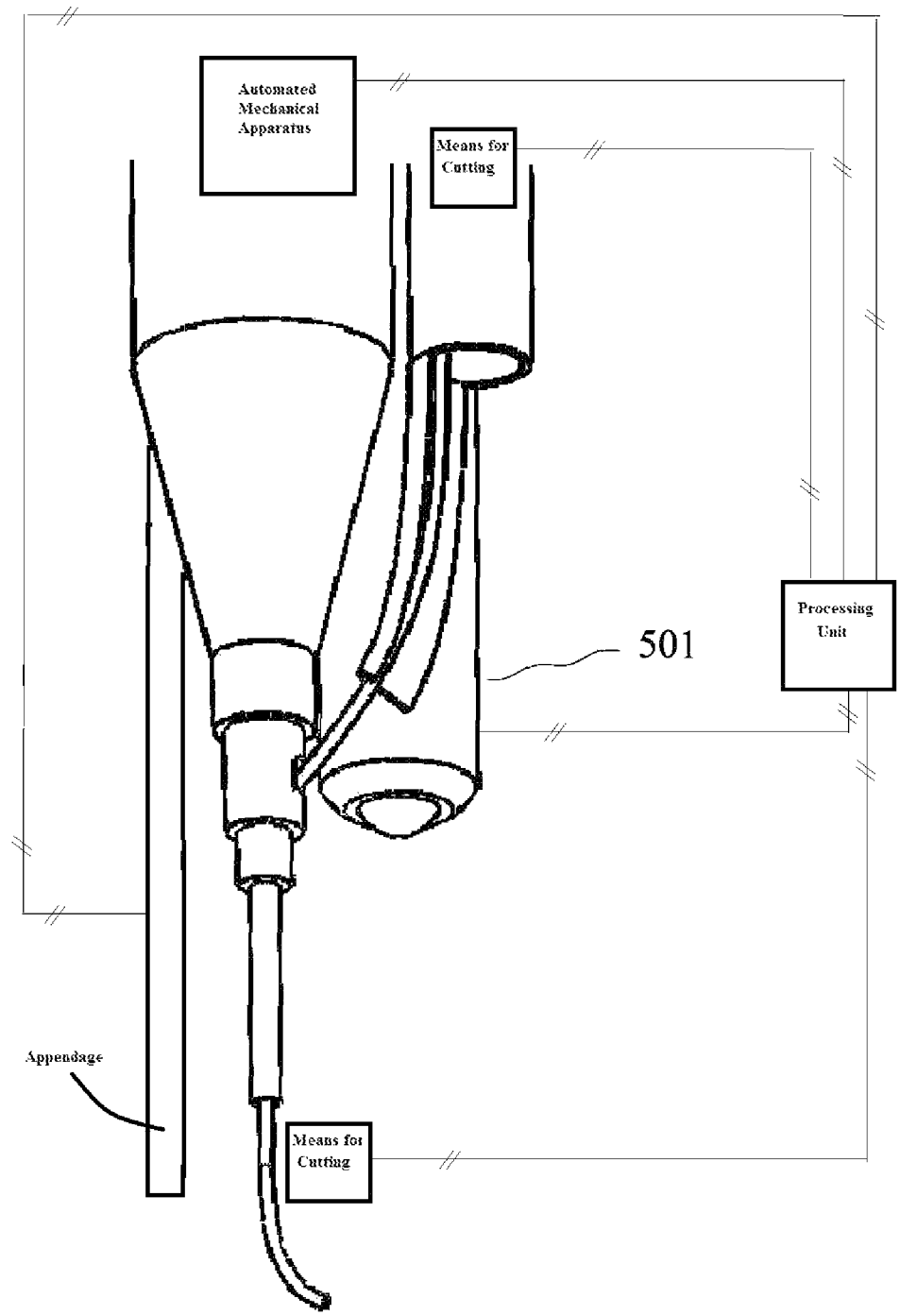
FIG. 5 is a perspective view of one embodiment of the extruder housing with an attached means of curing.

There are many potential means of curing, which are determined by the liquid primary material. Possible means of curing include light, heat, and chemical. Ultraviolet light on photosensitive polymer resin is the best mode. FIG. 5 shows an apparatus with a means of curing attached to the extruder housing. This figure shows an ultraviolet light 501 attached and aimed at the point of extrusion. Other methods of curing by light include microwave, electron beam, laser, and infrared. Additionally, some primary materials may cure by exposure to natural light.

The means for curing may also be chemical. If a two-part epoxy is used as the primary material, the composite path will cure without any additional means. Other embodiments include the introduction of a catalyst to the primary material in the extruder. The catalyst begins the curing process, and the path hardens soon after extrusion. The introduction of heat to a composite path also may aid the curing process.

The apparatus may include the means for curing, as in FIG. 5, or in other embodiments the means for curing may be external. An example may be a hand held ultraviolet light, or an oven within which to place the part.

Some embodiments may include multiple means for curing. An example might be multiple ultraviolet lights placed around the entire extruder to ensure curing of a path created at any angle. An alternative embodiment includes an ultraviolet light with directional control. It may be angled appropriately during the extrusion of a path to ensure curing through tight angles and complicated paths.

When a composite material path is complete, the path is cut at the point of extrusion. Any means of cutting will suffice, including a handheld blade. Some embodiments of the apparatus include a means for cutting. Possible means include mechanical blades or lasers.

The best mode of the apparatus will have two means of cutting, one for the secondary material at some point prior to the feeder flap, and one just after the nozzle. Embodiments with a means of cutting the secondary material afford increased functionality. An alternative secondary material may seamlessly feed into the path, or the path may continue with only the primary material.

Figure 2:
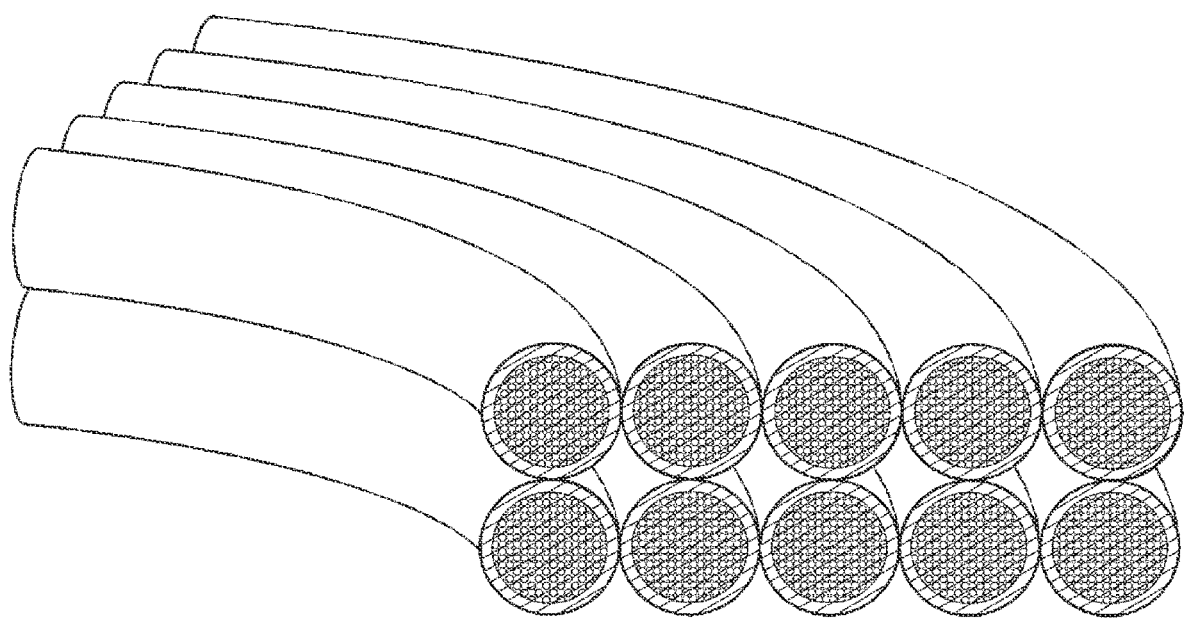
FIG. 2 is a section cut of a simple part with multiple paths.

A part may be constructed of one continuous path or may be formed from several paths. FIG. 2 shows a sectional view of a simple part with multiple paths. When constructing a part, each path is extruded sequentially. The first path is extruded and cut, and then another path is extruded and cut, connecting to some portion of the previous path. Additional paths are extruded until the entire part is formed.

When constructing a part, some portions may be created with composite material, and some portions may be created with only primary material. The apparatus has the option of creating paths with the composite material or with only the primary material. When a composite path is complete, it is cut. The next path in the creation of the part may be composite material, or may be of only extruded primary material.

This embodiment of the method is useful when the secondary material is needed only in small quantities. This embodiment of the method is also useful when the manufacturer requires only the exterior paths of a part to contain composite material, or alternatively, when the exterior paths are solely primary material intended to finish the surface.

The apparatus may be a handheld device. A simple apparatus with manual maneuvering and controls may be the optimal embodiment for certain repairs of existing parts or machinery.

The best mode embodiment is an automated mechanical apparatus. This embodiment comprises a means of numerical control for the location of the nozzle, and thus the extrusion point. The best mode for numerical control is a robotic arm, but other means of control, including a gantry system, are envisioned.

Using a computer independent of the apparatus, a three-dimensional digital model of the desired part is created with a computer-aided design (CAD) program. The model is stored as a digital file.

The model file is then delivered to a software program designed to convert the model into paths. This program is called the pathing software and translates the model into G-code. G-code is a numerical control programming language. It organizes a sequence of paths along with other coordinated controls in a digital file. A G-code file extension may be .mpt, .mpf, and .nc, among others. Some of the data stored in G-code for a particular part includes: the starting point, coordinates along a path, and endpoint for each path; the size of the part; which paths are composite materials; which paths are primary material only; where to cut a path or secondary material; the feed rate; the extrusion rate; and controls for the means for curing.

When the pathing software translates a model into G-code, it takes various factors into consideration. Depending on the needs of the manufacturer, certain parameters may influence the pathing sequence. Speed of manufacture, the need for continuous paths of composite material, the need for paths of primary material, the differences in the interior and exterior of a part, the desired interior matrix, and weight of the part are examples.

The G-code stores all of the information listed above, and in a coordinated matter. For example, the extrusion rate is synchronized to the feed rate, ensuring a uniform ratio of primary to secondary material throughout the length of a path. Another example is the coordination of the extrusion rate and feed rate with the start and end of a path. Both are stopped during the time the robotic arm is repositioning the nozzle to the next path starting point.

An external computer is linked to the apparatus through a means of data connection. An example may be a universal serial bus. The G-code file is transferred to the apparatus and stored in an electronic storage.

The apparatus is comprised of computer hardware and software necessary for the translation of G-code into extruded paths. Hardware and electronic components include: electronic data storage; microprocessor; random access memory; an external data connection; a digital display on the apparatus for a message log; motors for pumps, vacuum, compressor, numerical control system, and means for curing; input and output wiring to motors and lights; and connection to a power source.

Software components stored in the electronic storage and run on the processor include a primary material processing unit, a secondary material processing unit, a path termination processing unit, an energy curing processing unit, and a numerical control processing unit.

The primary material processing unit controls the functions associated with the primary material. This includes the extrusion rate, which is managed by a pump connected to a hose between the primary material reservoir and the extruder. Additionally, the primary material processing unit may control alterations to the nozzle. In alternative embodiments, the apparatus may possess multiple nozzles or an adjustable nozzle. For these embodiments, the primary material processing unit also controls a means of switching nozzles or adjusting the diameter or shape of an adjustable nozzle.

The secondary material processing unit controls the functions associated with the secondary material. This includes starting and stopping the feeding of the secondary material, as well as adjusting the feed rate during the extrusion of a path. In alternative embodiments with multiple spools containing secondary materials, this processing unit controls the means for switching between secondary materials during the manufacturing of a part.

The path termination processing unit controls the cutting of paths. This includes the cutting of the composite material at the end of a path, the cutting of the secondary material when a path is converting to a primary material only, and the cutting of the secondary material in order to alternate to another secondary material.

The energy curing processing unit controls the means for curing. In the best mode, the apparatus possesses an ultraviolet light aimed at the path just after the point of extrusion. During extrusion, the light will turn on and off at the beginning and ending of paths, respectively. For certain parts, this processing unit may also administer an intermediate light intensity.

Alternative embodiments may include the controlling of several means for curing, possibly several ultraviolet lights around the point of extrusion, curing the path from multiple angles. Another alternative embodiment includes a means for curing with an adjustable direction. The ultraviolet light may be mounted on an additional numerical control system affording constantly adjusted angles, which target the path as it trails away from the nozzle in varying directions.

The energy curing processing unit also controls methods that utilize an alternative means of curing. The processing unit will control the distribution of a chemical catalyst, the activation of a heat source, or the administration of any of the alternative means for curing listed above.

The numerical control processing unit controls the means of locating the point of extrusion. This processing unit maneuvers the nozzle to the starting point of the first path, the origin, and extrudes all paths sequentially in relation to that point. The means for numerical control is adjusted accordingly with the sequence of paths, taking into consideration the nozzle's angle of approach in relation to the part.

Prior to manufacturing a part, the manufacturer designates an origin. The origin may be any point on any surface suitable for anchoring the part during manufacturing. This point of contact is called an anchor. Some parts may require multiple anchor points to support a part during manufacturing.

Once the origin is located, the numerical control processing unit positions the nozzle so that the point of extrusion is at the origin. The primary material processing unit pumps the primary material from its reservoir through a hose, filling the extruder housing with the primary material. Simultaneously, the secondary material processing unit feeds the secondary material to the nozzle. The energy curing processing unit activates the ultraviolet light, and the composite material is extruded as the numerical control maneuvers along the first path.

When the first path reaches its endpoint, the path termination processing unit cuts the path, and the numerical control positions the nozzle for the start of the next path in the sequence according to the G-code. Paths are continuously extruded and cured until the sequence and the part is complete.

Alternative embodiments include another software component, a feedback processing unit. This processing unit gathers feedback from multiple sensors concerning the status of the apparatus and the currently extruding path. Sensors may include a visual input device, such as a video camera or infrared scanner, a thermometer, a pressure sensor, and input from the feeder motor.

During the extrusion of a path, the visual input device monitors the point of extrusion and the existing paths, relaying that information to the feedback processing unit. If the point of extrusion is misaligned relative to the existing part or the pathing coordinates, this processing unit will realign the extruder or halt the extrusion.

Similarly, information regarding temperature of the composite material, the motors, and the electronics is delivered to this processing unit. Also, information about the rate of extrusion, and pressure in all pumps and hoses is delivered to processing unit. If any feedback is outside designated parameters, the processing unit adjusts the system accordingly to ensure the correct extrusion of the current path. If feedback continues to lie outside designated parameters, extrusion is halted.

An alternative embodiment of the method calls for the curing of certain portions of the composite path at a later time. The energy curing processing unit will cure portions of the path upon extrusion, but leave some portions of the path uncured, or partially cured. The uncured portions are physically manipulated to interact with a cured portion of the part, creating what are called "locking paths".

The manipulation of the uncured portion of the path may be by a hand-held device. The best mode is an apparatus with a robotic arm on the extruder housing, which has an appendage suitable for manipulating the uncured portion. An alternative embodiment may have an appendage on another type of numerical control, or simply an appendage connected directly to the extruder housing. Another software component, the spatial manipulation processing unit, controls the movements of the appendage in coordination with the other processes.

The uncured portions of the path are adjusted so they interact with a cured portion. For example, the uncured portion may be wrapped around a cured portion. When the uncured portions are adjusted to the desired location, they are cured and hardened into their new position. The ability to intertwine the paths increases the strength of the part.

Figure 6:
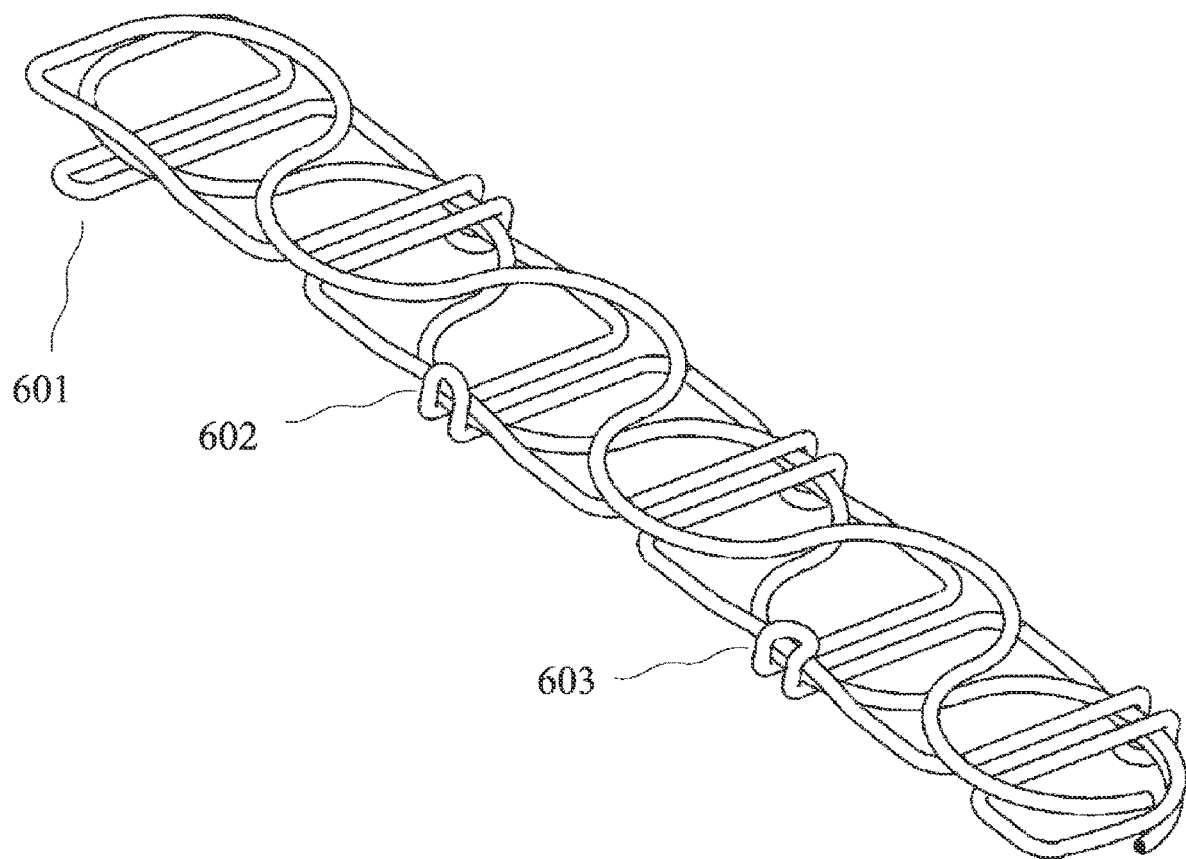
FIG. 6 is a perspective view of a simple part demonstrating the locking path process.

FIG. 6 shows an example part and the steps associated with creating locking paths. The drawing shows a continuous composite path extruded in a complex pattern. On this part, there are six u-turns, or loops, which were initially left uncured upon extrusion. The first loop 601 is uncured and in its original extruded form. The second loop 602 is uncured and in the process of being manipulated so it bends around a cured portion of the part. The third loop 603 is fully bent around a cured portion of the part.

The three loops on the anterior side of the part in FIG. 6 all went through the process demonstrated by 601 through 603. When the loops are fully bent around the respective cured portions of the part, they are cured and become locking paths.

Figure 7:
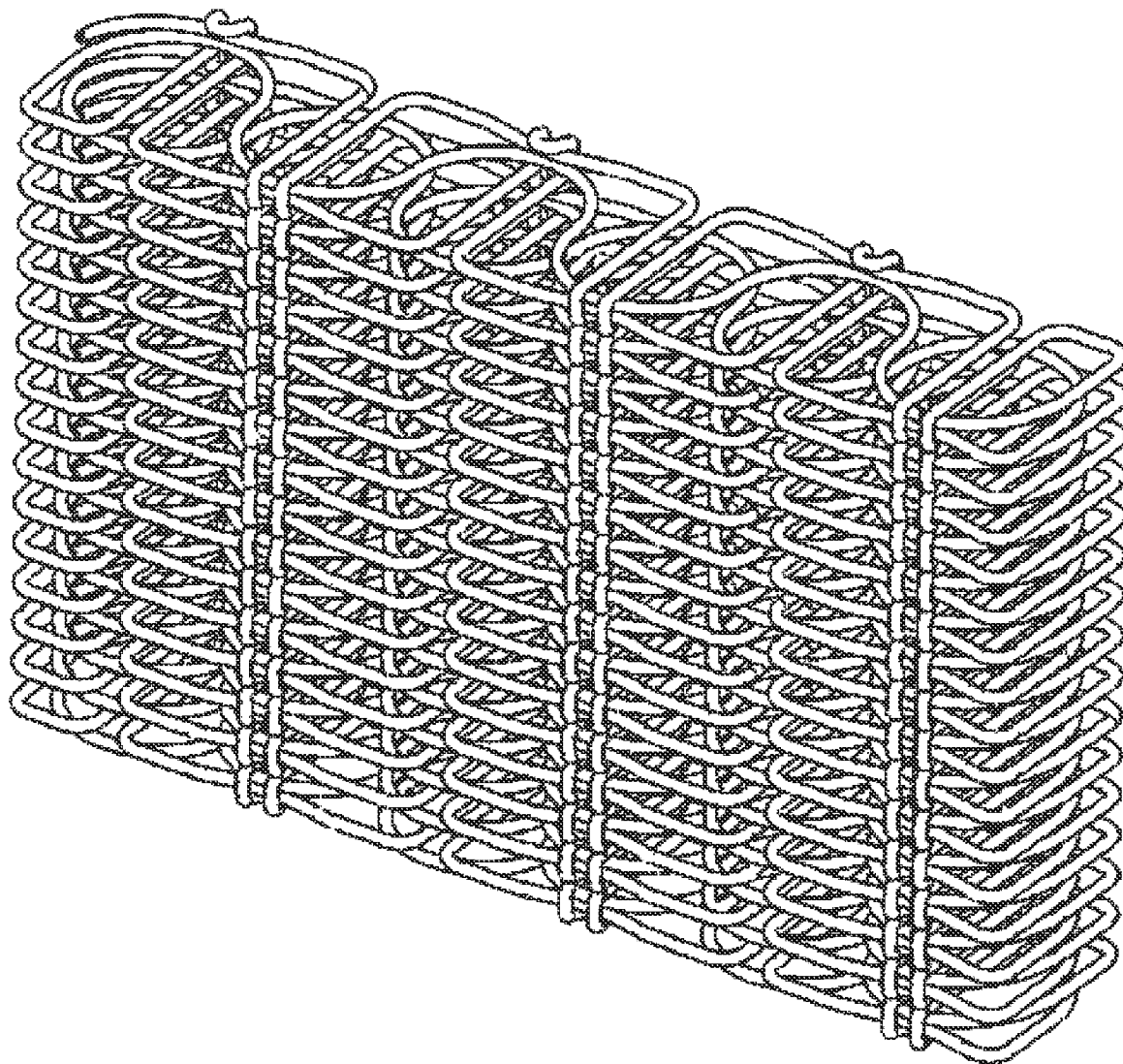
FIG. 7 is a perspective view of a simple part composed of several locking paths.

FIG. 7 shows a part with several iterations of the same locking paths in FIG. 6. When manufacturing this part, each loop is bent and cured intermittently as each layer of locking paths are extruded.

The method and apparatus described above affords the opportunity to extrude paths not previously available. The inclusion of a secondary material adds structural stability to the composite path, allowing extrusion into space opposed to gravity, as demonstrated in FIG. 8 and FIG. 9.

Figure 8:
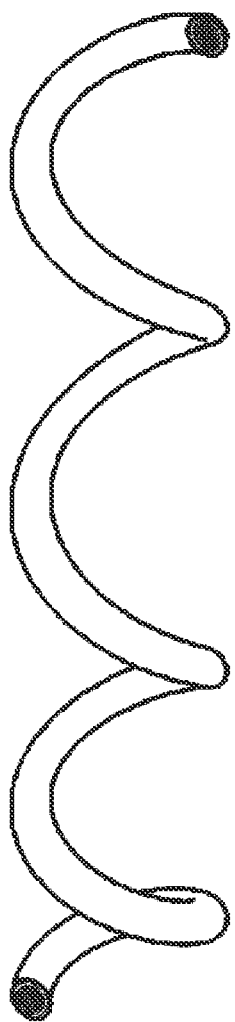
FIG. 8 is a perspective view of a spiral shaped path.

FIG. 8 shows a path extruded in a spiral form. The secondary material supports the path while it is being extruded, giving the designer and manufacturer more freedom in creating the part. Slicing methods of additive manufacturing by extrusion require a gravitational base beneath each layer. To extrude a spiral shaped part by slicing technique, additional material supporting each section of the spiral is required. This constricts the designer, requires more material to print a part, and increases the time of manufacture.

Figure 9:
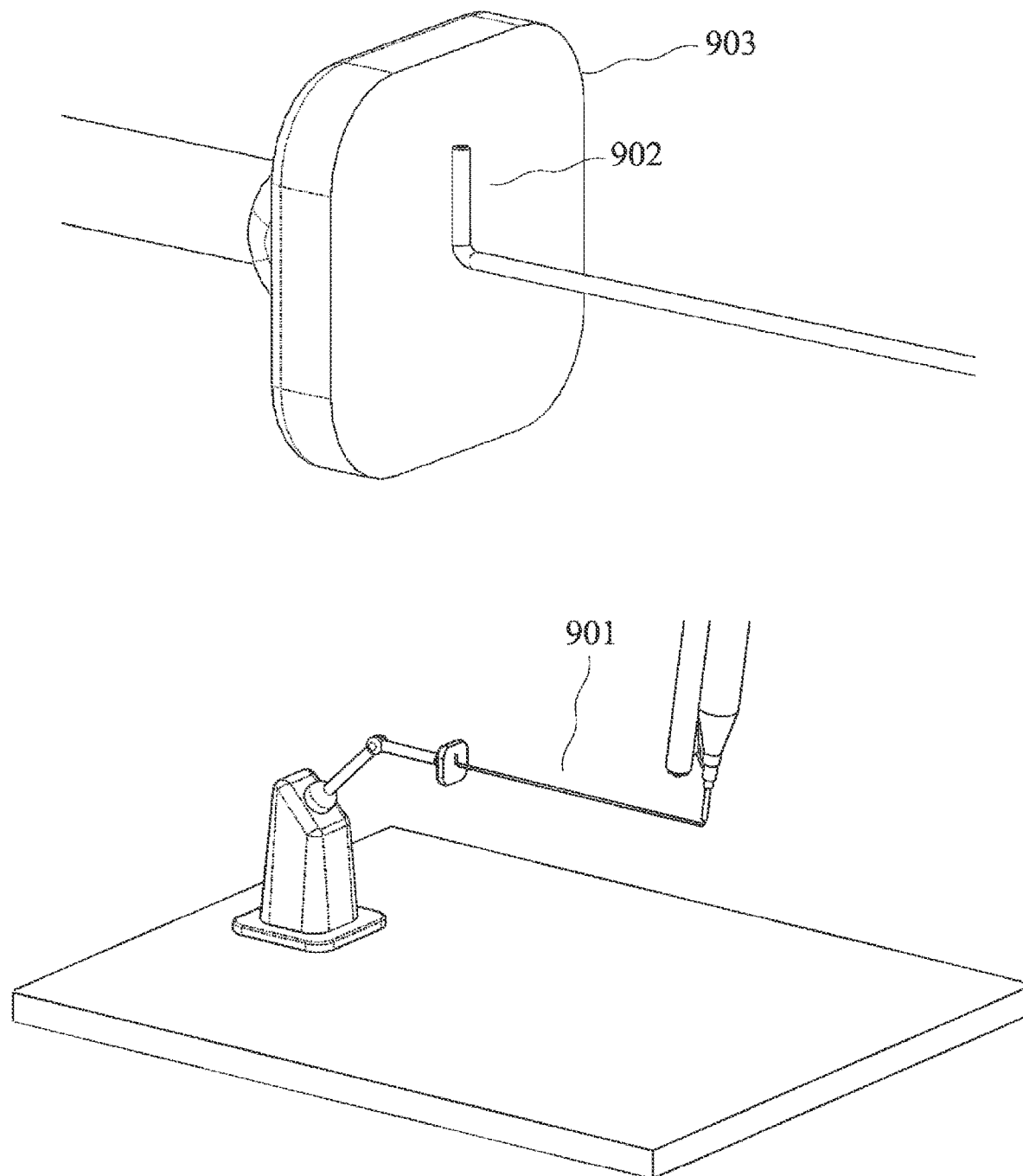
FIG. 9 contains a perspective view of an extruder forming a tension path from an anchor, and an enlarged perspective view of an anchor, foot, and tension path.

FIG. 9 shows a tension path 901. The composite path is first extruded onto an anchor 903. Any surface or point may provide an anchor point. In FIG. 9, the anchor is a vertical plane. The origin of the path adheres to the anchor, allowing the extruder to pull on the secondary material during the extrusion.

The addition of a secondary material allows the path to extend into space opposed to gravity and is useful in the extrusion of paths requiring long spans. Additionally, tension forces within a finished part provide structural strength.

The initial contact between the proposed part and the anchor must provide enough adhesion to support the tension force desired. Paths of greater tension may require an additional length of path extruded upon the anchor, to provide more adhesion. FIG. 9 shows a short length of path 902 extruded upon the anchor prior to extending horizontally away.

This initial length, called a foot, may or may not be portion of the finished part. In situations where the foot is simply functional during manufacturing, it is removed after the extrusion process.

Figure 10:
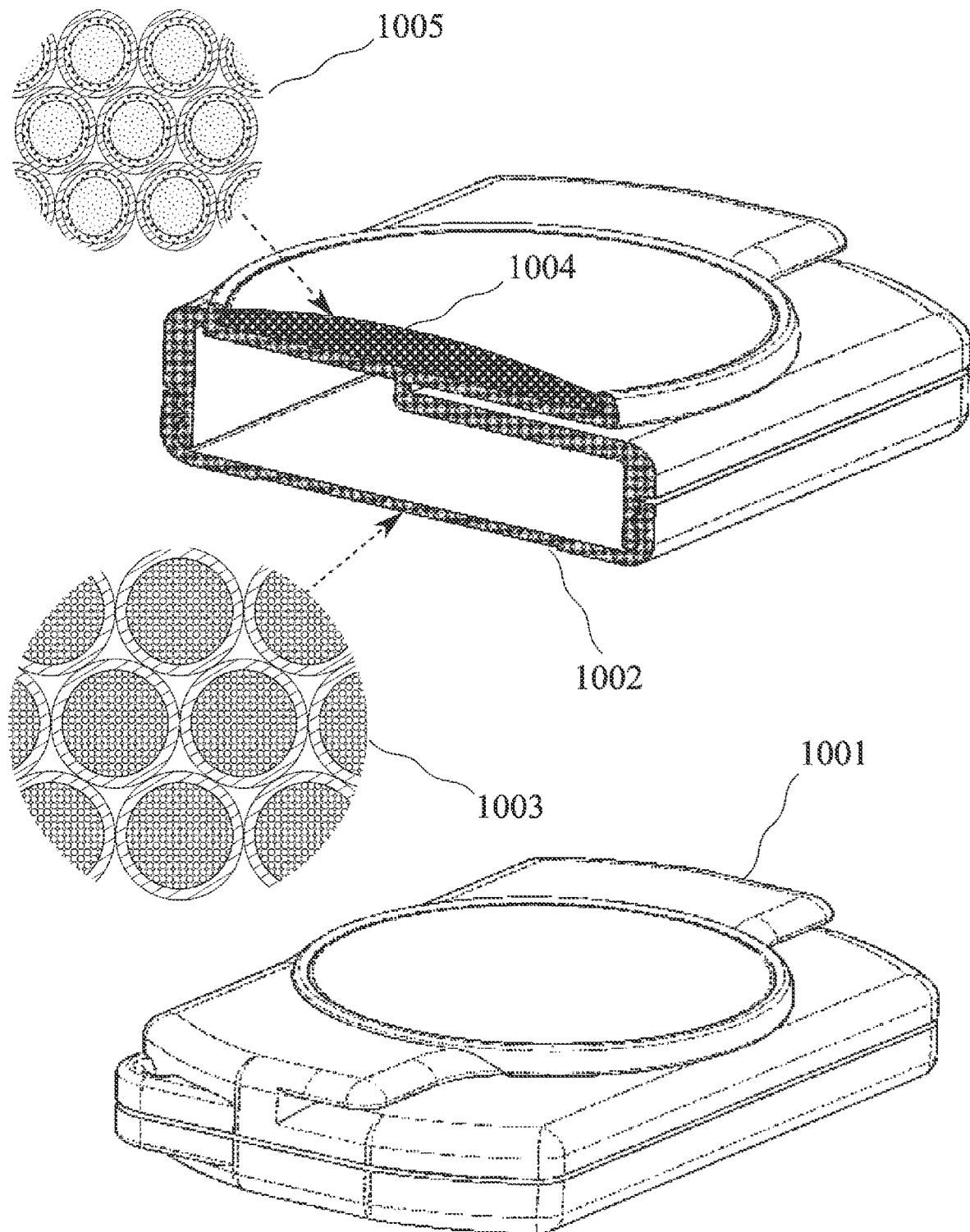
FIG. 10 contains a perspective view and a section cut of an electronic device.
Figure 11:
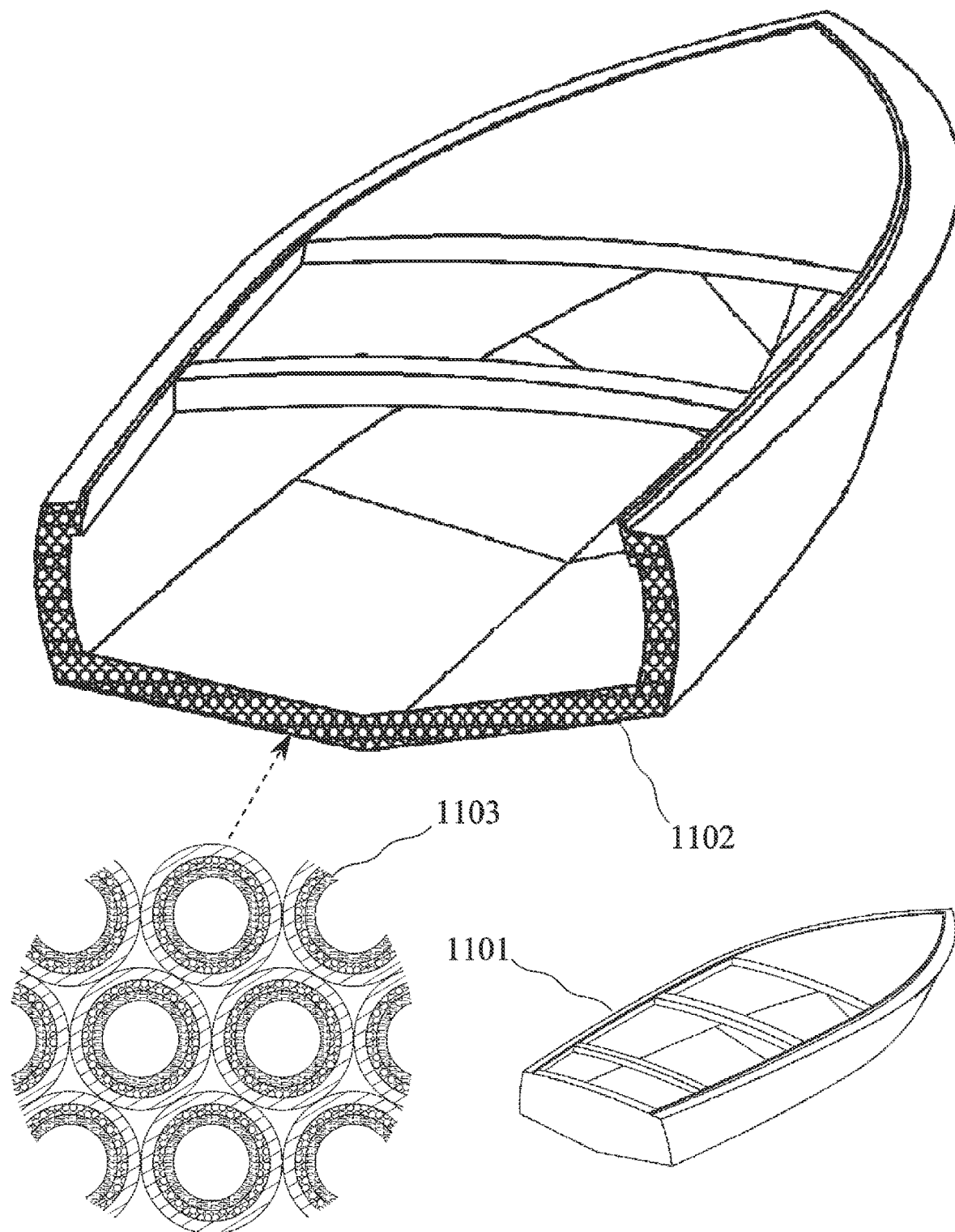
FIG. 11 contains a perspective view and a section cut of a boat hull.

FIGS. 10 and 11 show two products, a small electronic device and a boat hull, created by the method and apparatus. These two figures demonstrate a wide range of applications for the method and apparatus described above.

FIG. 10 is a small electronic device with a credit card reader and a touch surface 1001. The main body of the device is comprised of composite paths of carbon fiber encased within polymer resin, as represented by the pattern 1002. Cross-sections of the paths comprising the body are enlarged to enhance visibility 1003. The use of a carbon fiber and polymer resin composite creates a strong and lightweight body.

The circular surface on top of the device is comprised of composite paths of metal wire encased within fiber optics encased within polymer resin, as represented by the pattern 1004. Cross-sections of the paths comprising the touch surface are enlarged to enhance visibility 1005.

Metal wires in the composite paths enable parts to have electronic capabilities. In FIG. 10, the metal wires form a touch sensitive surface. The fiber optics in the composite paths enable the surface to illuminate. For example, when a user interacts with the surface by touching it, the fiber optics light up providing visual feedback regarding the interaction.

FIG. 11 is a boat hull 1101, comprised of composite paths of hollow rubber tubing encased within carbon fiber encased within polymer resin, as represented by the pattern 1102. Cross-sections of the paths comprising the hull are enlarged to enhance visibility 1103. The use of carbon fiber and polymer resin in the composite paths provide strength and lightness. The hollow rubber tubing in the composite paths create air pockets throughout, increasing the lightness and buoyancy of the hull.

What is claimed is:

1. A printing apparatus, comprising:
   a feeder feeding a fiber reinforced material at a feed rate;
   a dispensing port configured to emit the fiber reinforced material;
   a positioning system configured to move the nozzle during emitting to form an object from the fiber reinforced material;

a heater; and a computer system programmed to:

cause the positioning system to position a portion of the fiber reinforced material, the positioned portion hardening to support tension in the fiber reinforced material and allow the fiber reinforced material to be emitted by pulling the fiber reinforced material through the dispensing port;

cause the positioning system to move, at a movement rate different than the feed rate, the dispensing report relative to the positioned portion of the fiber reinforced material, the movement generating tension in the fiber reinforced material, supported by the positioned end of the fiber reinforced material, that emits the fiber reinforced material by pulling the fiber reinforced material through the dispensing port.

2. The printing apparatus of claim 1, wherein the printing apparatus is a desktop printer.

3. The printing apparatus of claim 1, wherein the positioning system includes at least one of a robotic arm and a gantry.

4. The printing apparatus of claim 1, wherein the fiber reinforced material is a fiber strand pre-pregged with a polymer.

5. The printing apparatus of claim 4, further including a hardening device mounted to the dispensing port and configured to harden the polymer in the fiber reinforced material after emission.

6. The printing apparatus of claim 5, wherein:
the polymer is a thermoplastic; and
the hardening device is configured to change a temperature of the thermoplastic to harden the thermoplastic.

7. The printing apparatus of claim 5, wherein:
the polymer is a thermoset; and
the hardening device is a UV light.

8. The printing apparatus of claim 5, further including a cutter configured to cut the fiber reinforced material.

9. The printing apparatus of claim 8, wherein the cutter is located upstream of the dispensing port.

10. The printing apparatus of claim 8, wherein the cutter is located downstream of the dispensing port.

11. The printing apparatus of claim 5, further including a feeder configured to feed the fiber reinforced material to the dispensing port.

12. The printing apparatus of claim 11, wherein the feeder includes a motor.

13. The printing apparatus of claim 12, further including:
a spool storing the fiber reinforced material; and
a platform, wherein the motor is configured to feed the fiber reinforced material from the spool onto the platform to emit the already positioned end of the fiber reinforced material.

14. The printing apparatus of claim 1, further including a cutter configured to cut the fiber reinforced material.

15. The printing apparatus of claim 14, wherein the cutter is located upstream of the dispensing port.

16. The printing apparatus of claim 14, wherein the cutter is located downstream of the dispensing port.

17. The printing apparatus of claim 1, further including a feeder configured to feed the fiber reinforced material to the dispensing port.

18. The printing apparatus of claim 17, wherein the feeder includes a motor.

19. The printing apparatus of claim 18, further including:
a spool storing the fiber reinforced material; and
a platform, wherein the motor is configured to feed the fiber reinforced material from the spool onto the platform to emit the already positioned end of the fiber reinforced material.

20. The printing apparatus of claim 1, wherein:
the dispensing port is a first dispensing port; and
the printing apparatus includes a second dispensing port.

21. The printing apparatus of claim 1, wherein the computer system is further programmed to:
form a first layer of the object using the first dispensing port; and
form a second layer of the object using the second dispensing port.

* * * * *

UNITED STATES PATENT AND TRADEMARK OFFICE
CERTIFICATE OF CORRECTION

| | | Page 1 of 1 |
|---|---|---|
| PATENT NO. | : 12,162,215 B2 | |
| APPLICATION NO. | : 18/500400 | |
| DATED | : December 10, 2024 | |
| INVENTOR(S) | : Kenneth Lyle Tyler | |

It is certified that error appears in the above-identified patent and that said Letters Patent is hereby corrected as shown below:

In the Claims

Claim 1 should read:
1. A printing apparatus, comprising: a feeder feeding a fiber reinforced material at a feed rate; a dispensing port configured to emit the fiber reinforced material; a positioning system configured to move the nozzle during emitting to form an object from the fiber reinforced material; a heater; and a computer system programmed to: cause the positioning system to position a portion of the fiber reinforced material, the positioned portion hardening to support tension in the fiber reinforced material and allow the fiber reinforced material to be emitted by pulling the fiber reinforced material through the dispensing port; cause the positioning system to move, at a movement rate different than the feed rate, the dispensing port relative to the positioned portion of the fiber reinforced material, the movement generating tension in the fiber reinforced material, supported by the positioned end of the fiber reinforced material, that emits the fiber reinforced material by pulling the fiber reinforced material through the dispensing port.

Signed and Sealed this
Twenty-eighth Day of January, 2025

Coke Morgan Stewart
*Acting Director of the United States Patent and Trademark Office*